Jan. 2, 1923.
J. P. TARBOX.
SYSTEM OF CONTROL FOR PRINTING MACHINES.
ORIGINAL FILED APR. 10, 1917.
1,440,567
14 SHEETS-SHEET 7
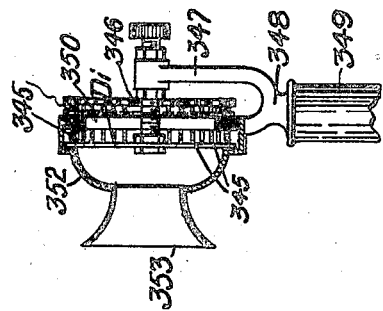
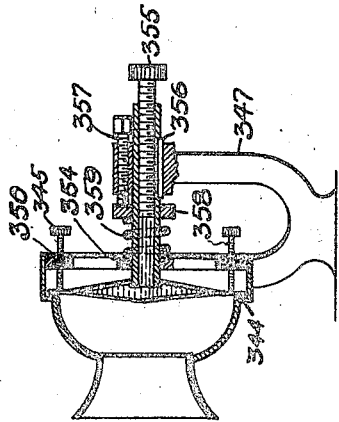
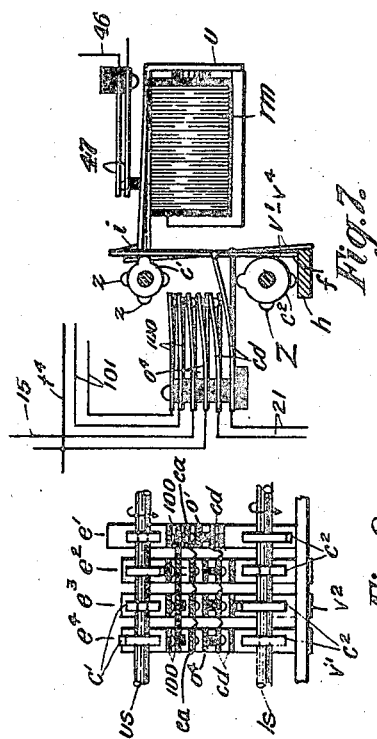
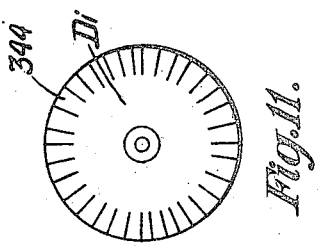
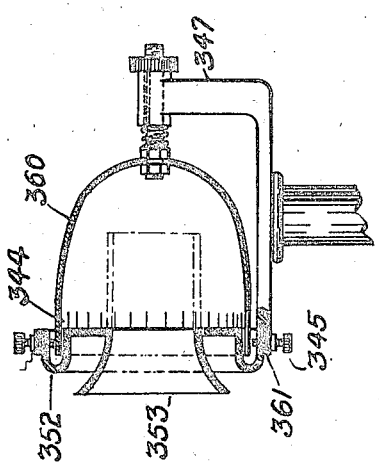
Inventor
John P. Tarbox

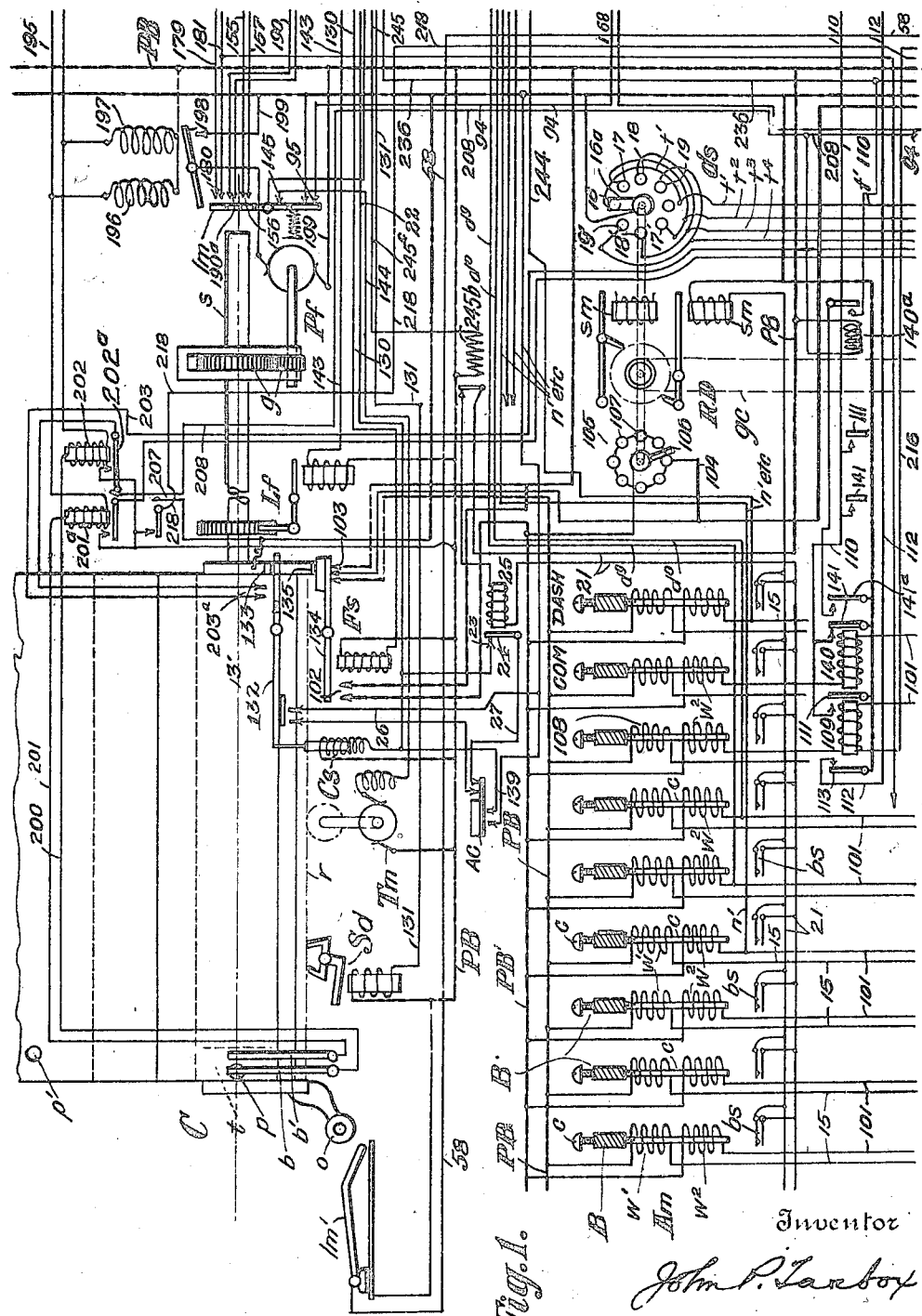

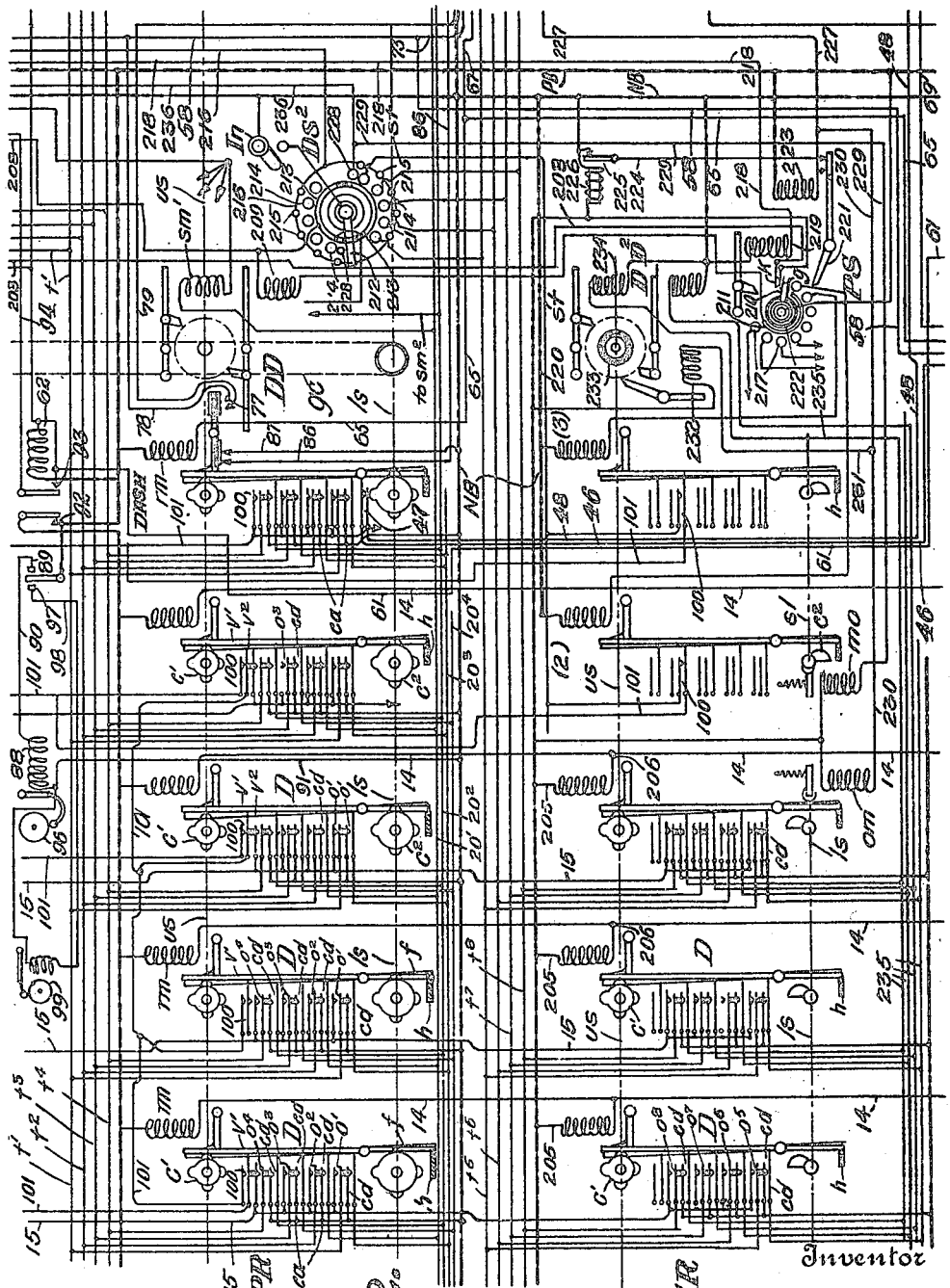

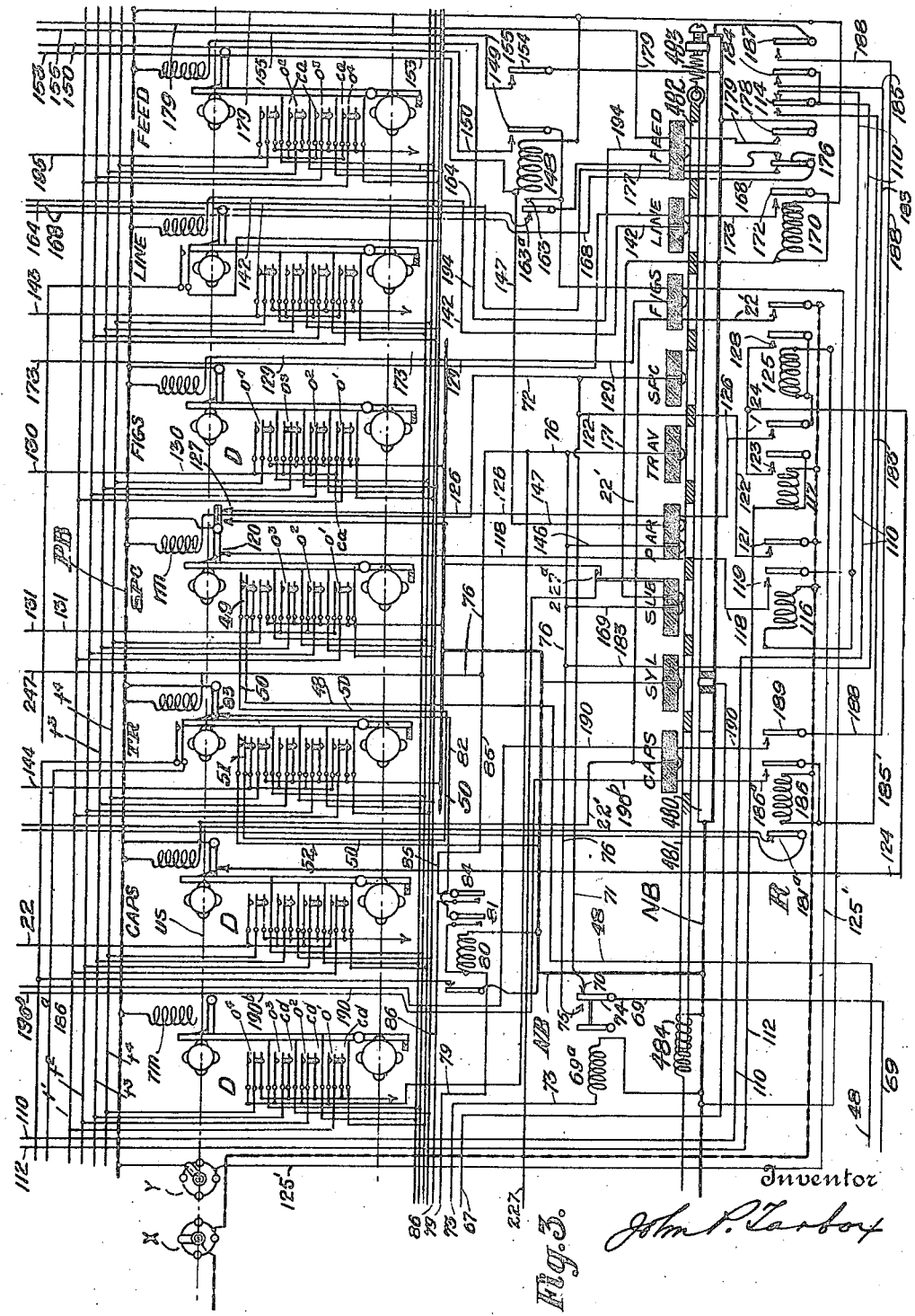

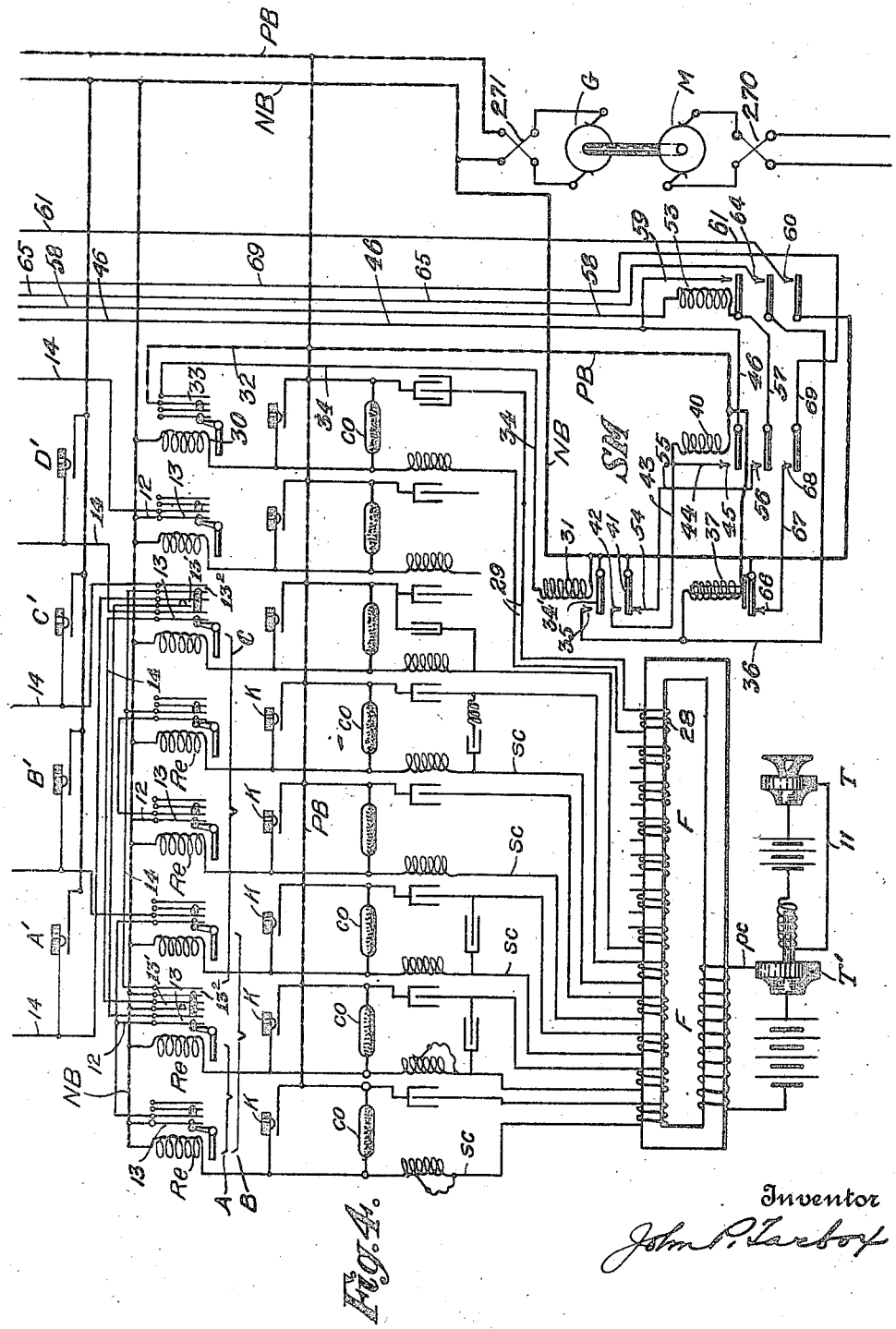

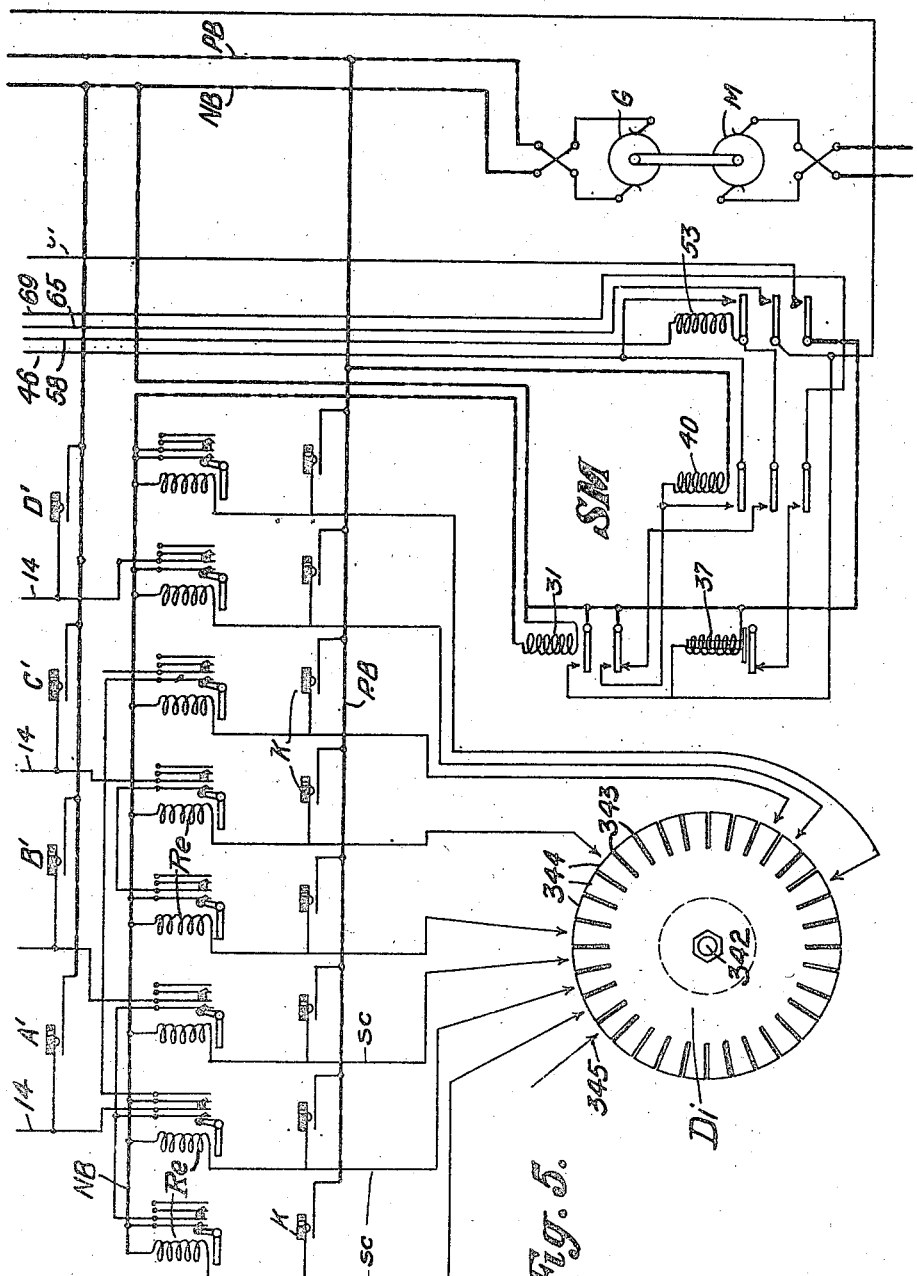

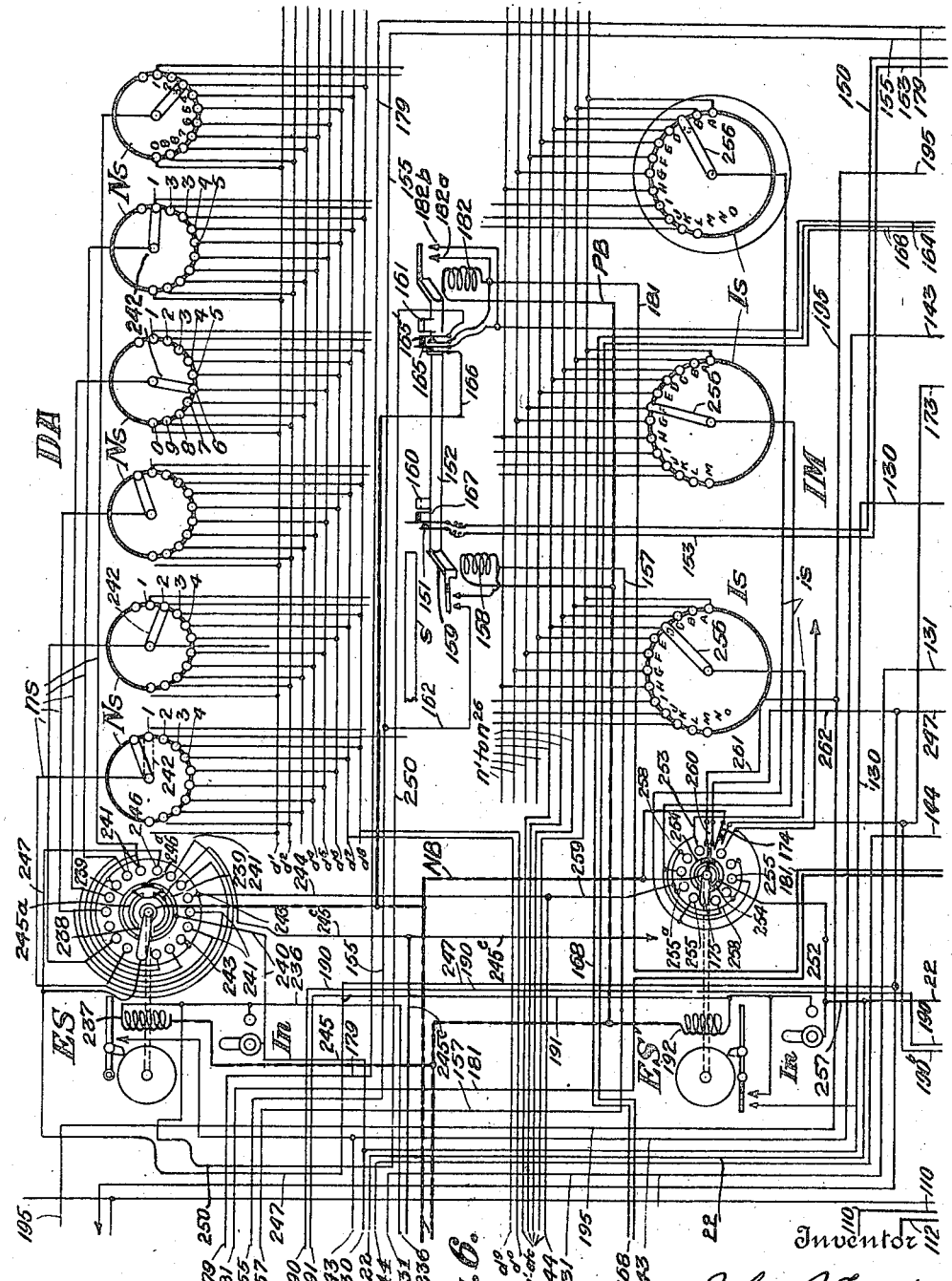

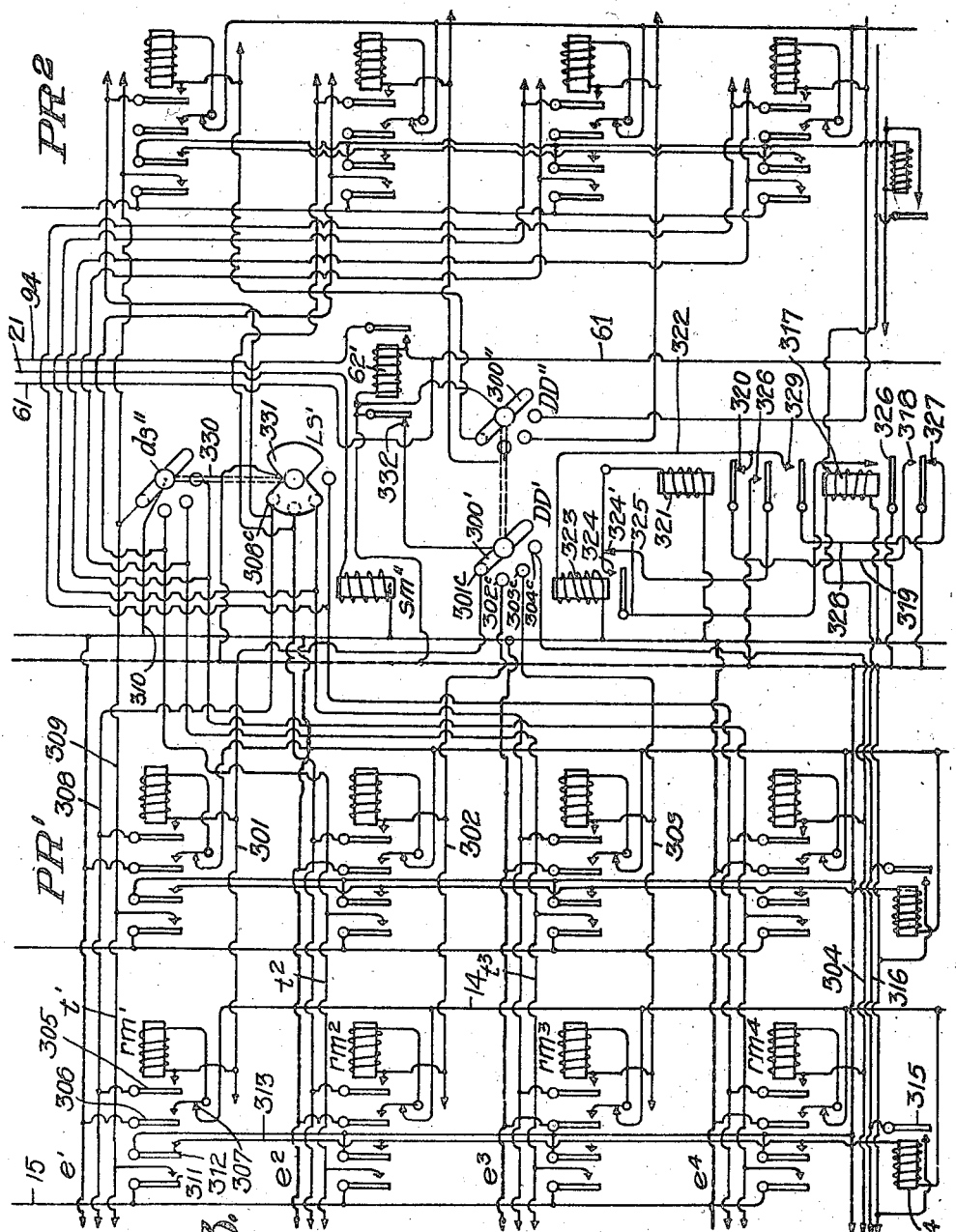

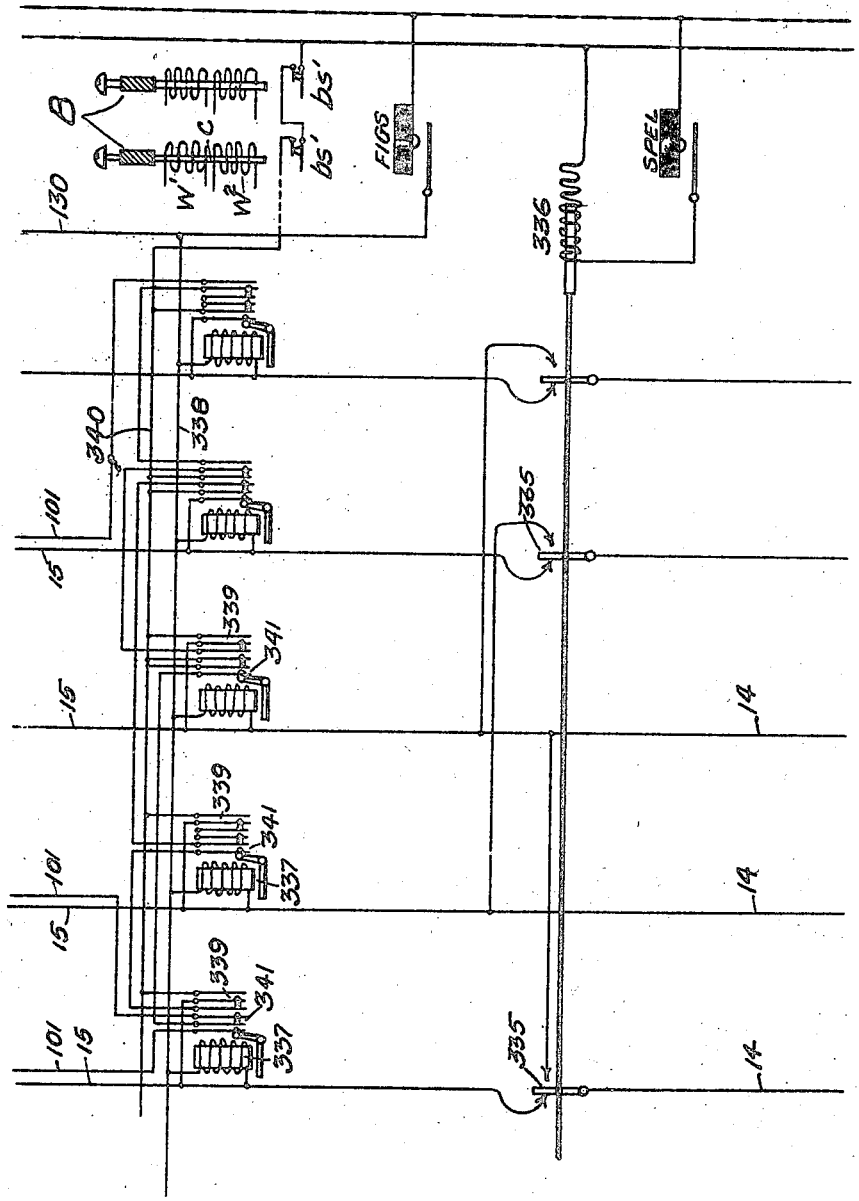

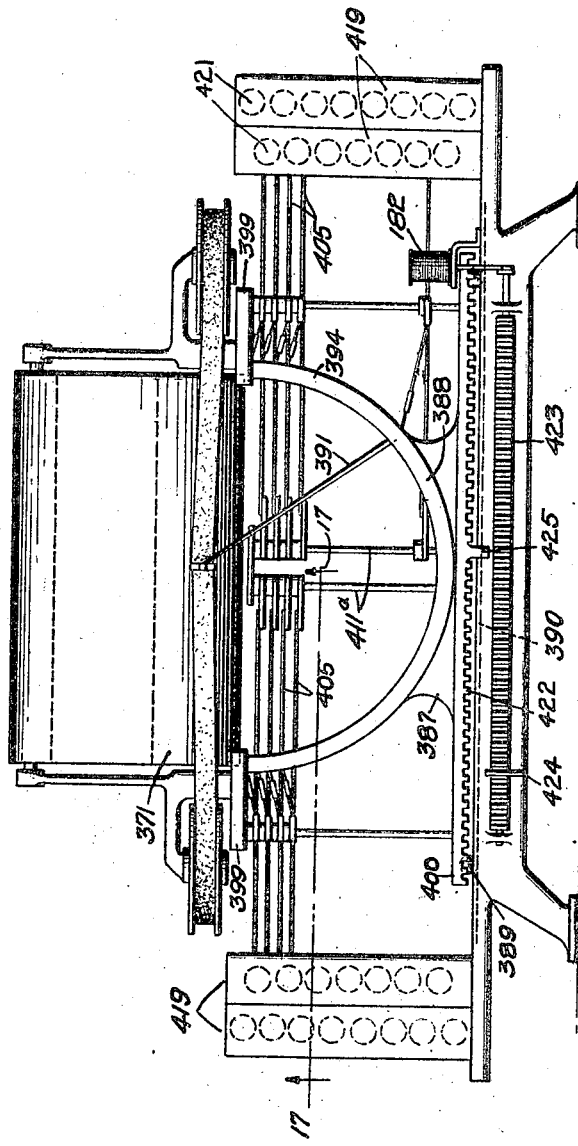

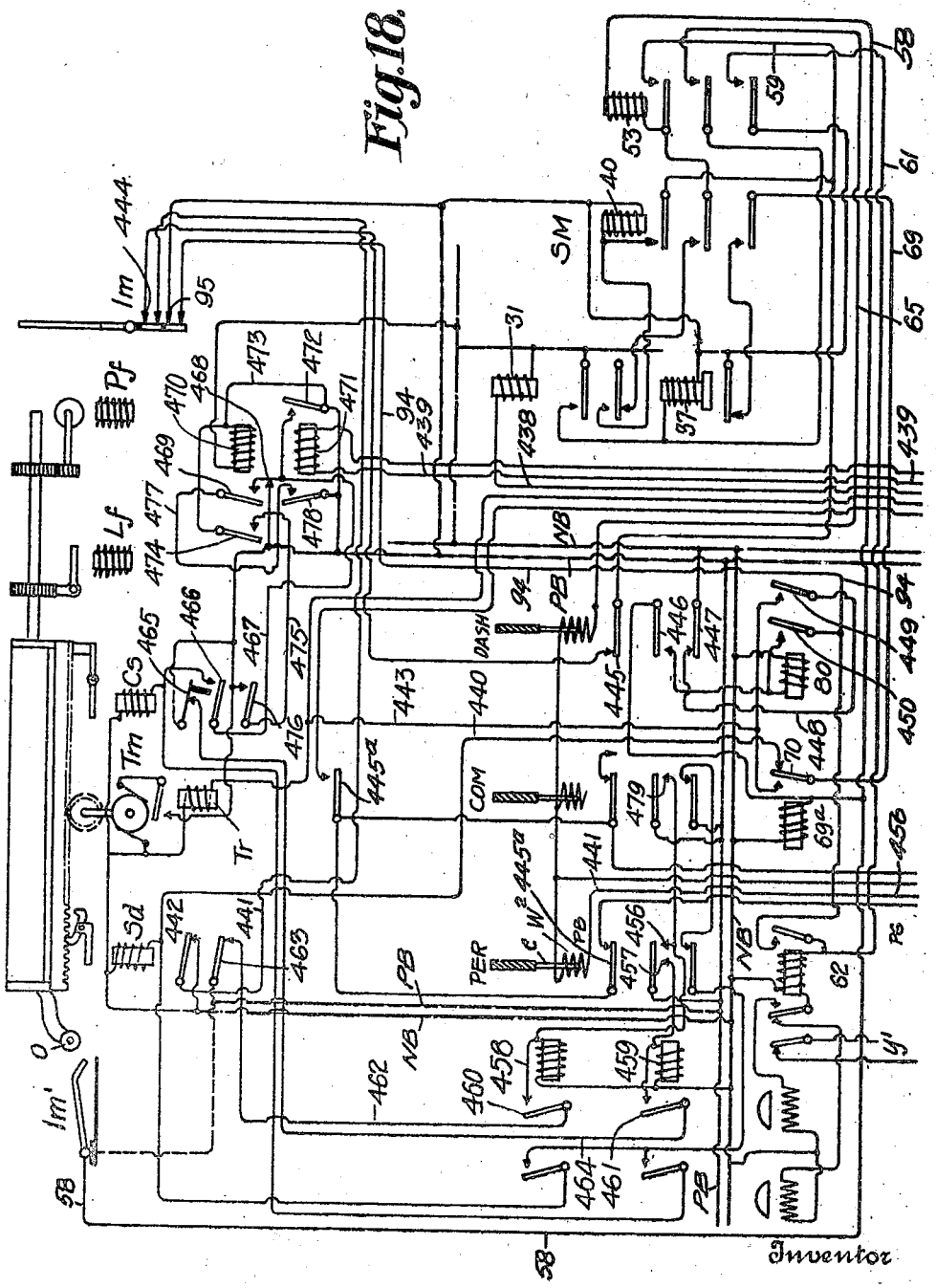

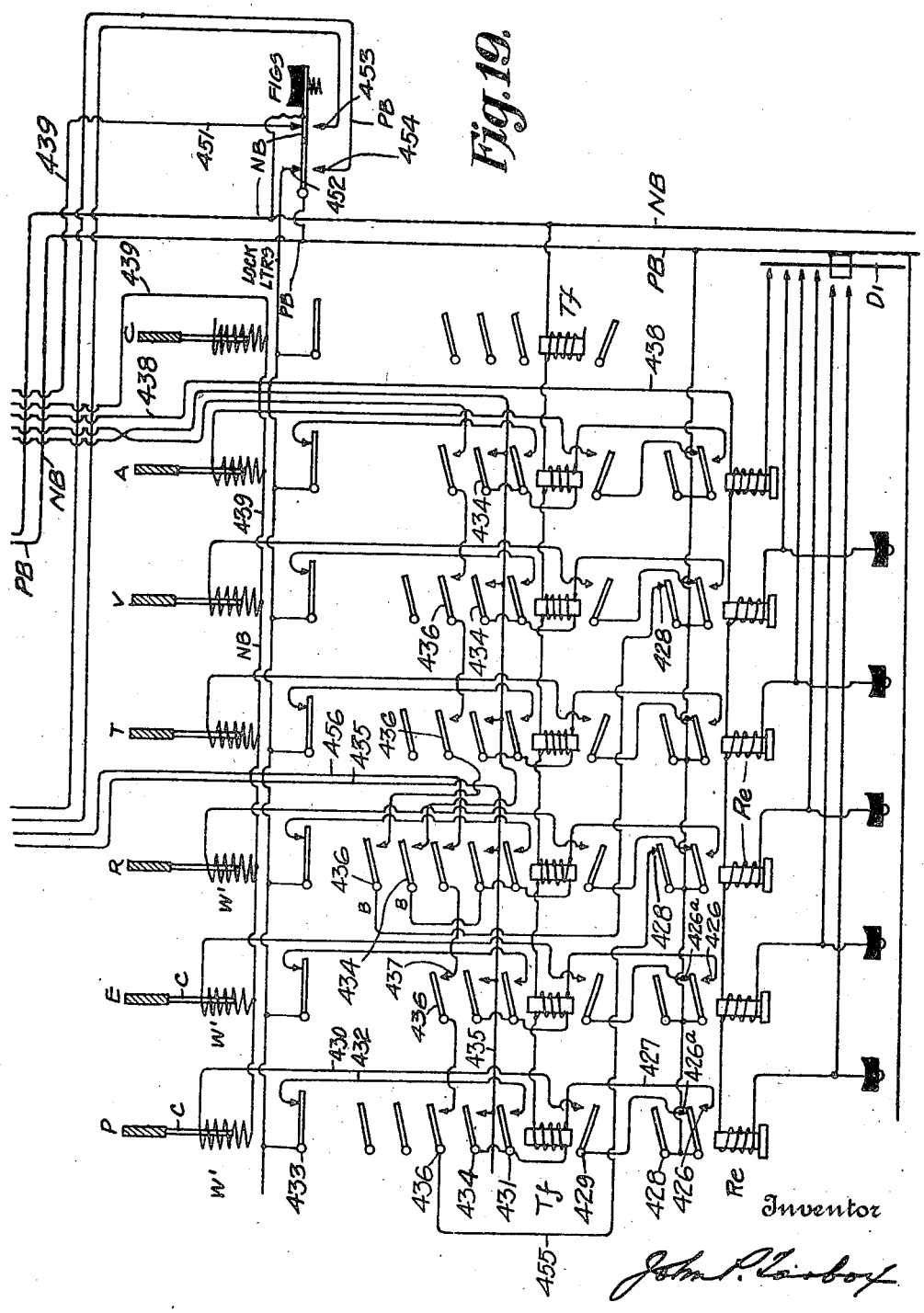

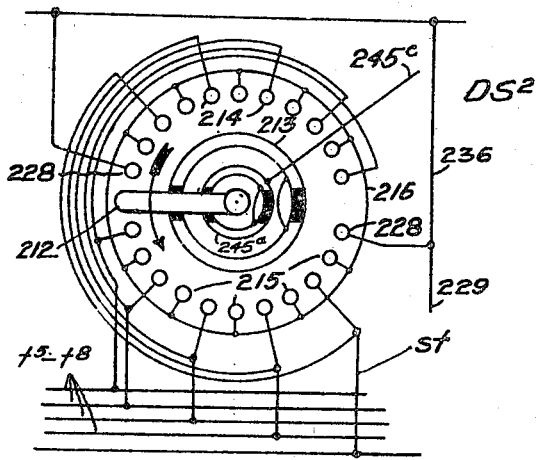
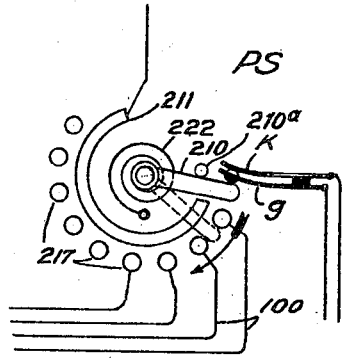
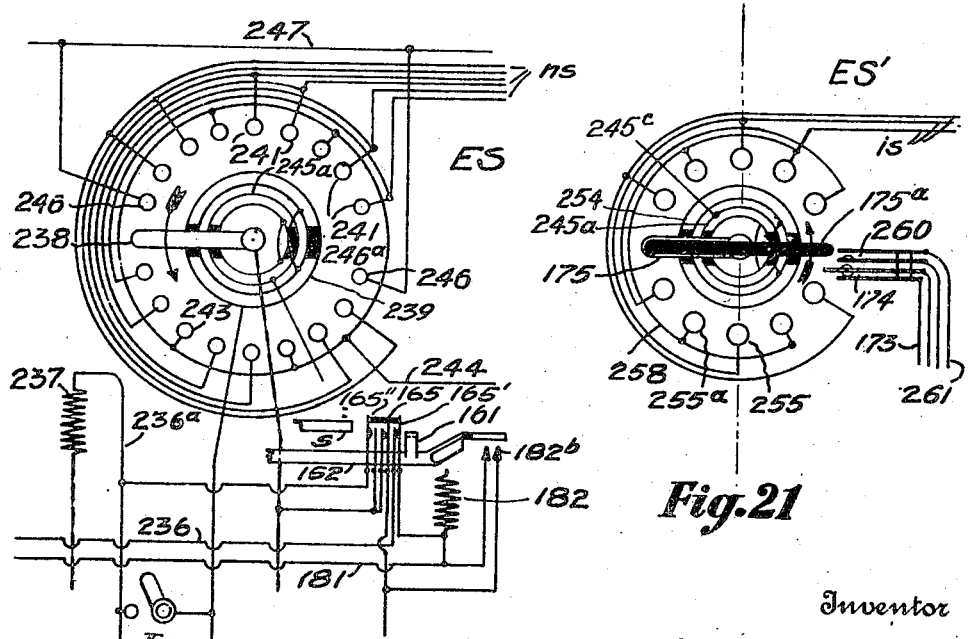

Patented Jan. 2, 1923.

1,440,567

UNITED STATES PATENT OFFICE.

JOHN P. TARBOX, OF GARDEN CITY, NEW YORK.

SYSTEM OF CONTROL FOR PRINTING MACHINES.

Application filed April 10, 1917, Serial No. 161,016. Renewed June 2, 1922. Serial No. 564,621.

*To all whom it may concern:*

Be it known that I, JOHN P. TARBOX, a citizen of the United States, residing at Garden City, in the county of Nassau and State of New York, have invented certain new and useful Improvements in Systems of Control for Printing Machines, of which the following is a specification.

The system of control for printing machines of my invention is adapted especially for use in connection with apparatus for deriving a record of any sort from the energy of the sound of the human voice, for use also in connection with printing, telegraph apparatus and electrically operated typewriting or printing machines, and still further in connection with any similar machines where the high rate of action and speed of operation are primary desiderata. While the system of control was invented primarily for use in connection with the first-named apparatus, to wit: that for effecting a record thru the energy of the sound of the human voice, this apparatus is not claimed herein and is shown but diagrammatically for purposes of illustration of the manner of connection of such apparatus with the system of control. Fundamentally the system may be manipulated by manually operated keys provided for its use in connection with an electrically operated typewriter or other form of printing or type machine or by connection to telegraphic lines through suitable translating apparatus. It will be understood however that all of these primary control means shown are but illustrative and that the system of operating the typewriting machine may be used in connection with any means or system of control desired. In addition there are shown several different modifications of apparatus operated by the energy of the sound of the human voice, in connection with any of which the system of my invention may be operated, and still further, there are listed in the context of the specification a number of others derived by inventors other than the writer. In this application, however, applicant does not claim herein any of the several forms of sound analyzing apparatus (termed by him vocal analyzers) inasmuch as the same has already been made in part the subject of a divisional application (S. N. 312,516 Filed July 22, 1919,) and is to be made the subject of other divisional applications. Thus, this application is directed solely to the system of control per se. This system in and of itself may be operated not only in connection with any of the various vocal analyzers or machines for printing by sound now known to the art or to be known, but may be effectually applied in any of the several other fields of usefulness above set forth, and perhaps others not now known to the applicant.

In considering the various systems of control for printing machines which are available for adaption for use in high speed operation applicant has found them one and all lacking in most of the fundamental requirements of a fully rounded and completely automatic operation such as pertain to commercial acceptance of a sound operated recording or signalling machine, especially one operated by the sound of the human voice. Applicant has invented this system to fulfill these requirements and in so doing he has, he believes, so improved upon systems already in use for recording at high rates of speed as to render possible the increase of overall efficiency of all systems of this class. Assuming any control, telegraphic, manually operated keys, vocal analyzer or other, is capable of effecting individually the record of each letter of the alphabet or any multiple number of letters, and further the grouping of such letters into properly spaced and punctuated words, phrases and sentences, or equivalent groups as in a code record each function in these operations may be termed a primary requirement of the operating means. The system of control of my invention employed in conjunction with such operating means will so operate the typewriting or printing machine as to carry out automatically and at the very highest rate of speed all such requirements of record composition, as capitalizing, spacing after punctuation, syllabilizing at line ends, traverse of carriage, line feeding, subscribing, paper feeding, page numbering and initialing, dating, subscripture initialing and the like. Such requirements may be termed secondary requirements. In other words, given an operating means effective to manipulate a typewriting machine to compose the informal elements or parts of the record, the system of control of my invention will automatically take care of each and every one of the formal requirements of the record, relieving the mind of the operator and his hands or any machine which may be used for the same purpose of transmission or operation, of all burden in connection with formal action of the machine.

A single illustration will suffice preliminarily to engaging upon the full detail of the specification. According to ordinary systems the operator has to repeat the initials of the addressee upon pages of the record succeeding the first and also to number and date those pages. The system of my invention enables this record to be made automatically and correctly at the head of each page succeeding the first without personal attention of any nature or control function other than primary function of any control element. For the same letter and for the same date these particular records are always the same and are therefore called formal records and the operations thru which they are made formal operations.

Still further, my invention comprehends means for prevention of interference between actuations so close in sequence as to approach simultaneousness, thus enhancing the rate of actuation attained in both primary and secondary operations.

My invention is shown diagrammatically in the accompanying drawings—

Figure 1 shows diagrammatically the typewriting mechanism per se including the carriage, the type bars, actuating elements therefor, and auxiliary controlled and control devices;

Fig. 2 shows what I term the register mechanisms, and the page numbering device.

Fig. 3 shows additional register mechanisms and the normally operable control keys of the machine;

Fig. 4 shows one form of voice operated control device, or what I term a vocal analyzer.

Fig. 5 shows another form of the same;

Fig. 6 shows the circuits of the dating and initialing devices;

Figs. 7 and 8 are side elevation and transverse section respectively of an element of the register mechanism;

Fig. 9 is a longitudinal vertical section of a vocal analyzer;

Fig. 10 is a similar section of another form of analyzer;

Fig. 11 is a front elevation of a diaphragm used in the form of Fig. 9;

Fig. 12 is a longitudinal vertical section of still a third form of the type of Figs. 9 and 10.

Fig. 13 is a diagram of an intermediate register system making use of successively acting relays;

Fig. 14 is a diagram of change spelling connections which may be used if desired;

Fig. 15 is a front elevation of a proposed special form of typewriting machine for this work;

Figs. 18 and 19 delineate a modified system in which the registers are omitted;

Figs. 20–23 are respectively diagrams on a large scale of the primary contact banks in certain step by step switches used in Figs. 2 and 6.

Figure 16:
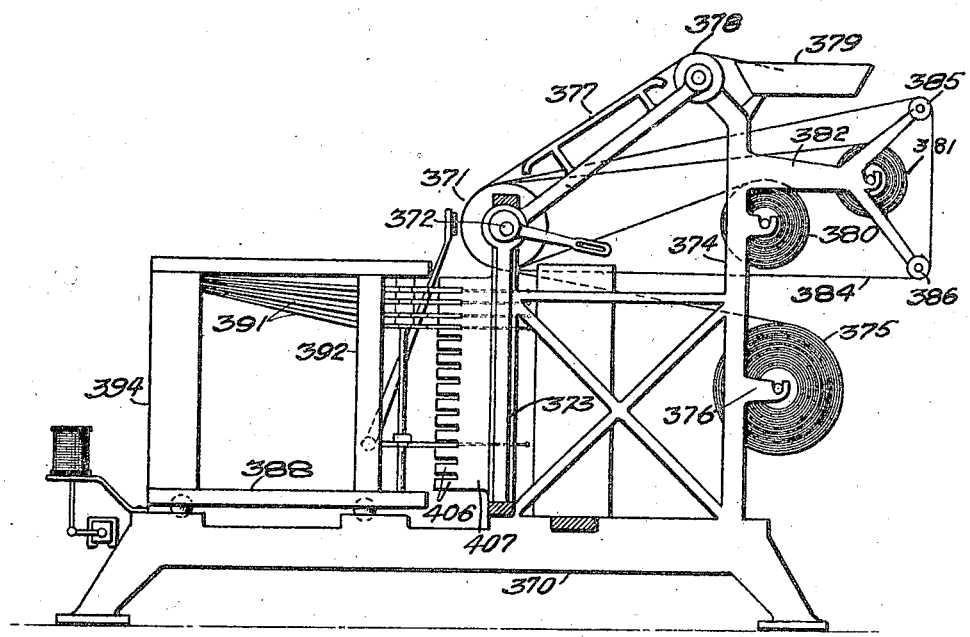
Fig. 16 is an end elevation of the same.

In Fig. 1 C designates the carriage and platen of any standard typewriter, and B—B are the horizontal type bar beams, shown in section. To these the type bars are connected as usual. The carriage and platen C are shown as the traversing elements of the machine. If desired instead the "basket" of type bars may be made the traversing element. This has the advantage that the automatic feeding of paper to the platen from rolls and duplicating by a continuous band of carbon, as shown in Fig. 16, is not interfered with.

The carriage is traversed to left by spacing device $Sd$, and to right by traversing motor $Tm$, the latter geared to the carriage or by any suitable means, a shaft and pinion being shown.

The paper feed from line to line is accomplished by an electromagnetically actuated line feed device $Lf$, the mechanical features of which may be of any of the well known forms. The paper feed of greater extent than line feed is accomplished by a feed motor $Pf$ geared to the axis of carriage C by means of the extended shafts and gears $g$, one of which is splined on shaft $s$. A conducting segment $t$ on one end of the carriage, coacting with brushes $b$—$b'$ which bear upon it through perforations $p$—$p'$ in the paper, has to do with the control of the motor $Pf$ of the paper feed device. The paper is fed from a roll as shown in Fig. 16.

The "caps" shift device is shown at the right and designated $Cs$, while the "figs" shift device is designated $Fs$.

Left and right marginal switches $lm'$ and $lm'$ control the marginal operations of the various devices. The right hand marginal switch $lm'$ (which appears on the left of the figure) is cam operated by cam roller $o$, connected with the carriage C, while the left hand marginal switch $lm$ is operated by shaft $s$ of the platen or other equivalent means.

The type beams B—B are electromagnetically actuated by actuating magnets $Am$, shown as of the solenoid type and having each two windings $w'$, $w^2$, acting on a common core or armature $c$, adjustably connected with the type beams.

The register mechanisms of Fig. 2 are designated PR and SR respectively. PR is the primary register which receives the translated controlling energies of the voice, temporarily registers or stores them, and thereafter releases the same to operate the actuating magnets A$m$ connected with the type bars. It consists of a plurality of devices D, one for each character or less, and which are controlled in their operations by a distributing device DD (Fig. 2), and a releasing device RD (Figs. 1 and 2).

One construction of the registering devices D is shown in detail in Figs. 7 and 8, a bank of contacts comprising a plurality of tiers $e^1$—$e^4$. In this case four are shown jointly controlled by register magnet $rm$. There are five or more contacts to each tier (Fig. 7) and the lowermost is connected in each case to a vertically extending spring strip $v$. They are biased at their bottom ends toward the tier $e$ by their own spring or a separately applied spring. The upper ends of strips $v$ are provided with projections $i$ adapted to be engaged commonly by armature $u$ of magnet $rm$, whereby the strips $v$ are raised and the contacts of any tier $e$ are closed. The lower ends of strips $v$ by reason of their bias when they are raised to close the contacts move laterally over and abut against the top of a common holding bar $h$. Parallel to bar $h$ are upper and lower cam shafts $us$ and $ls$, carrying sets of cams $c'$, $c^2$, one cam in each positioned to engage each vertical strip $v$. The cam shaft $us$ is operated from the distributing device DD of the register mechanism PR (Fig. 2), while the cam shaft $ls$ is operated by gearing connection $gc$ with release device RD (Figs. 1 and 2). The sets of cams $c'$, $c^2$, associated with all of the devices D bear the same angular relation to each other, and the individual cams $c'$ of each set successively engage in linear order vertical strips $v$ of the tiers $e$ with their projections $z$. By projection of the cams $c'$ on shaft $us$, the strips $v$ may one after another be moved forwardly to place projections $i$ in position to be engaged by the outer end of armature $u$, the normal position of the strips $v$ being with projections $i$ clear of armatures $u$. By projections Z of cams $c^2$ of shaft $ls$, the lower ends $f$ of strips $v$ may be one by one pushed from holding bar $h$ against which they come to rest when strips $v$ are raised, as aforesaid, and the contacts thereby held closed are opened.

Referring again to Fig. 2, $t'$ to $t^4$ are four battery trunk conductors, common to all the registering devices D and having respectively contacts $o'$—$o^4$ in the respective tiers $e'$ to $e^4$ of devices D. Each winding $w'$ of actuating magnet A$m$, Fig. 1, has a contact $ca$ in each tier $e'$—$e^4$ commonly connected therewith by multipled conductor 15.

These trunks $t'$ to $t^4$ are successively connected to battery by switch device $ds$. Device $ds$ is a step-by-step device controlled by type bar switches $bs$ in multiple closing the circuit of stepping magnets $sm$ of the device.

Device DD, driving shaft $us$, is on the other hand controlled by contacts $cd$ in the tiers $e'$ to $e^4$ of the devices D, closing the circuits of stepping magnets $sm'$ by way of conductors 20' to 20$^4$, one for each tier $e'$ to $e^4$.

The portion of the primary register PR shown in Fig. 3 is associated with the controlling keys of the machine designated SYL (syllable), SUB (sub-scripture), PAR (paragraph), TRAV (traverse), SPC (space), CAPS and FIGS (capitals and figures), LINE and FEED. When the system is used for printing by sound substantially the entire manual control of the machine is had through these nine keys, and normally only one of them, the "CAPS" key, is in use. A group of relays R has to do with the connections between the controlling keys and the devices D of the register and other elements of the machine.

The secondary register SR of Fig. 2 is structurally in most respects similar to the primary register PR. Four trunks $t^5$ to $t^8$ have contacts $o^5$ to $o^8$ in devices D, and are controlled by a distributing switch DS$^2$. Cam shaft $us$ is stepped by device DD$^2$ governed as before by contacts $cd$ in devices $d$. Shaft $ls$ however is not driven from distributing device DS$^2$, but is oscillated by magnet $om$. The function of this portion of the secondary register SR is to register the initials of the addressee and thereafter effect the impression thereof on each page written. A device D is provided for each letter of the alphabet as in the case of mechanism PR.

Two or more devices D, D shown on the right hand (2), (3) are permanently associated with a special trunk S$t$ of the group $t^5$ to $t^8$, and the connection is made by these devices D in accordance with the control of page numbering switch PS. A special oscillable release shaft $sl$ is operated by magnet $mo$. The function of this portion of the device is to successively number the pages written.

Fig. 4 shows a form of vocal analyzer which may be used for printing by sound through applicant's system of control. Any other form of vocal analyzer may be used, e. g., that of Ferguson. It comprises a special transformer F, and associated primary transmitter T controlling by relay transmitter T', circuit PC and resonant secondary circuits $sc$. The secondaries $sc$ govern relays R$e$, which in turn control the magnets $rm$ of register devices D (Fig. 3). Circuits $sc$ are each tuned to respond to a characteristic component of the phonetic sound of a different letter, various combinations of resistances, inductances and capacities being used for that purpose as shown. Any combination found suitable may be used in any circuit. The coherers co associated with these circuits may be of any known type, and decohering (if necessary with the type) accomplished in any known way.

Keys A', B', C', etc., are provided on the register side of relays Re for the manual operation of the machine, and keys k on the transmitter side for manual operation through relays Re.

The mechanism SM at the lower right is the spacing and syllabilizing mechanism which is operated altogether automatically.

M, G is a motor generator set of small size furnishing current for the operation of the various devices of the machine by positive and negative bus wires PB and NB.

The mechanism DA of Fig. 6 is the dating mechanism. It comprises six manually set number switches Ns having contacts connected in multiple to the magnets Am of the numeral characters, trunks ns leading therefrom, and a switch ES controlling the energization of the trunks.

The mechanism Im is the initialing mechanism. It comprises three or more manually set initial switches Is having contacts multiply connected to the actuating magnets Am of the letter characters, and like the mechanism DA, trunks is leading to and energized by an energizing switch ES'.

The various details of the machine and its circuits will be described in connection with the operation. For the sake of brevity and completeness operation of the system of control when used for printing by sound will first be described. Manual, telegraphic and other applications will then be more readily understood.

Dictation is into the transmitter T'. Through the action of transmitter circuit 11 on repeater transmitter T (or upon any known form of repeater device) the intensity, and volume of the voice waves is increased. Acting on transformer F through primary winding pc, the waves may be still further increased in size. The voice waves of each letter energize one or more predetermined tuned circuits sc, and through associated coherers or detectors co or the equivalent close the circuits of associated direct current relays Re. Each relay (or combination of relays as will appear hereinafter) controls by its contacts a circuit as follows including a magnet rm of register device D. Bus NB at the relays, conductor 12, contacts 13, (or 13 and 13' according to the combination of relays Re) conductor 14, magnet rm and bus PB at devices D. Magnet rm being energized pulls up that tier of contacts $e'$ to $e^4$ whose vertical bar v is at that time pushed forward by cams c' on shaft us.

We will assume this tier is tier $e'$ connecting with trunk t' (see Figs. 7 and 8). The circuit of the associated actuating magnet Am is therefore closed from trunk t', through contacts of tier e', (which may be identified in Fig. 2) conductor 15, winding w' of magnet Am, and to the bus PB, then to bus NB at switch ds, arm $16^a$, contact 16 of contacts 16, 17, 18, 19, and 16', 17', 18', 19' (connected respectively in diametrically opposite pairs with trunks t' to $t^4$) to trunk t'. Winding w' of magnet Am becoming energized draws its core or armature down and operates the type beam B to print a code character corresponding to the letter dictated.

When tier e' of device D was pulled up it closed by contacts cd one of the four loops 20' to $20^4$ which loops are multipled respectively to the contacts cd of the various devices D. This energizes one of the four (only one is shown) actuating magnets sm' associated with device DD and steps the upper cam shaft us, thus rotating the shaft us one step (shown as one-quarter revolution, but it may well be less) and pushing forward the actuating bars $v^2$ (Figs. 6 and 7) of the second tier $e^2$ of each device D, into position to be engaged by the armatures of magnets rm. In the meantime the bar v' previously actuated is held in actuated position by the engagement of its foot f, with the common holding bar h (see Figs. 7 and 8). Therefore when the armature of magnet rm drops back upon deenergization the previously actuated contacts of tier e' remain in actuated position. This is true of each tier of contacts, and moreover each tier closes its associated loop of the group 20' to $20^4$, each thus stepping the device DD and shaft us one step. Thus is secured a very important result. Characters successively registered on primary register PR are identified each with a different trunk of the group t' to $t^4$, since each tier of each group e' to $e^4$ makes connection with a different one of the trunks. This admits of operation at any and all rates within wide variations, and in case a word is rapidly pronounced, several letters may be registered on register PR during the printing of one. By increasing the number of tiers of contacts e' to $e^4$ per device D and the number of trunks t' to $t^4$, the permissible number of advance registrations may be increased.

Each time an actuating magnet Am pulls up over a circuit closed from a device D of the register mechanism, at or near the limit of movement of the type beam B, a limit switch bs is actuated to close the loop 21 which closes the circuit of an actuating magnet sm of stepping device RD, thus stepping switch ds one point. Thus the wiper $16^a$ energizes trunks t' to $t^4$ successively from bus NB, and in the same order as the trunks are associated by cams 'c' with tiers $e'$ to $e^4$ in the stepping of device DD. By this means the plurality of registered characters are successively printed, not in the time succession in which they are dictated and registered, but in accordance with the natural operating speed of the typewriting machine itself. This is the ideal method, for irrespective of variations in rapidity of operation, between one syllable and another, one word and another, and of different persons, the printing speed is independent, and determined at all times by the natural (which is by far the most rapid and smooth) speed of the machine. Nor do variations in the rate of action of any type bar cause any disturbance in the regular operation, each succeedingly operated bar being dependent upon the rate of operation of the precedingly operated bar for the initiation of its operation.

Obviously this method of operation is of value in manually operated typewriters as well as in machines for printing by sound, for the rates of operation of the individual type bars are independent of the rate and the time order of succession of operation of the various keys. Interference due to any cause which would effect actuating energies in the sequence approaching simultaneousness is eliminated. Thus crossing or sticking of type bars, and disorderly operation of any sort is positively prevented. Controlling keys A', B', C', etc., Fig. 4, are provided in shunt to the relays Re (Figs. 4 and 5) for manual operation and control of the circuits of register magnets $rm$.

The number of trunks $t$ to $t^4$ may be increased or decreased at will to suit any existing conditions, the associated apparatus being readily altered by the skilled operator to suit in point of number of steps, cams, contacts, etc.

The trunks $t'$ to $t^4$ are successively released from devices D by the stepping of lower cam shaft $ls$ which pushes the feet $f$ from bar $h$. This stepping takes place from and in synchronism with the stepping of switch $ds$, being connected therewith by chain or other gearing connection $gc$. The cams $c^2$ of shaft $ls$ are arranged in the same order, but one step behind as respects contacts 16 to 20, etc., of switch $ds$, so that upon the energization of each trunk by switch $ds$, the preceding one is released by cams $c^2$ from the then associated device D. In other words the release of any trunk takes place as the next succeeding trunk is energized. Therefore there is always available one or more free trunks. As many as three of the four (or four of five, etc.,) may be tied up to devices D at one time, but upon momentary slowing up or cessation of operation the printing catches up and they are successively freed, whereupon they are all available. The adaptability of this method as between operator and machine is full and complete. The personal equation of the operator alters in no way the orderly operation of the machine.

The operation of all other elemental characters controlling and actuating circuits from the vocal analyzer of Fig. 4 when printing by sound is substantially the same for each letter of the alphabet or its code equivalent and hence need not be individually traced herein. There is one exception to be found in the circuits of those characters identified by the energization of a plural number of resonant circuits $sc$. Suppose one letter sound characterized by frequency or wave form $(a)$, another by $(d)$, and a third by both $(a)$ and $(d)$. If simple circuits as that just traced from relays Re be used then the sounding of the third letter will pull up register devices D of both the first two. But combination circuits are used as shown for the sake of illustration in connection with the circuits controlled by the A' and D' keys (Fig. 4). The A' circuit 14 governed by normally open contacts 13 of the A' relay Re extends through normally closed contacts 13' on the D' relay Re, and vice versa, whereby if either the A' relay or the D' relay Re pulls up singly, the particular individual circuit A' or D' is closed to conductor 14, but if both the A' and D' relays Re pull up in response to dictation of a third letter, both the A' and D' circuits are opened at contacts 13', and instead a third circuit 14 of the C' key is closed through normally open contacts $13^2$ on relays of the A' and D' circuits in series. Thus are combinations and interlocks made to effect registration or differentiation of the complex sounds from each other. The skilled engineer may work out as many of these combinations and interlocks as desirable, using any of the combinational and interlocking circuit arrangements known to the art, whereby each letter sound is positively identified with the circuit 14 of a single letter character A', B', C', etc., including a single register magnet $rm$. Others of these combinations are indicated by brackets, that for letter A by bracket A, that for B by bracket B, etc.

*Capital letters.*

Any letter or word may be written in capital letters by simply pressing the CAPS control key of Fig. 3. The pressure of this key closes the circuit of caps magnet $Cs$, Fig. 1, as follows: Bus NB, CAPS key, conductor 22' device D22 (Fig. 6, Fig. 1) magnet $Cs$ and to bus PB. This shifts carriage C, and as long as the CAPS key is held depressed, all words dictated are written in capital letters. If however the CAPS key is only momentarily pressed the CAPS magnet Cs locks itself up through normally closed contacts 23 and 24 of relay 25 by conductors 26 and 27, from bus NB. Relay 25 is in one arm of loop 21 which is closed each time a type bar B is actuated. Hence upon printing of the first letter after the CAPS key is released, the locking circuit of Cs is broken at 23, 24, and the carriage C returns to normal position. Thus the first letter only of each sentence is capitalized. It is necessary to use this key only at the beginning of operation, as a rule, as will be seen hereinafter.

The time of closure of the loop 21 and consequent energization of relay 25 may be varied at will through adjustment of cores c or their connected parts, which strike contacts bs, so as to bear any desired relation to the stroke of the type bars. The magnet Cs is shown as operating through lever 132 and abutment 133 directly upon one end of the carriage C, but it will be understood that this showing is diagrammatic, and that the magnet Cs (and the magnet Fs) operate upon any of the standard carriage shifting levers or other parts now used for that purpose.

Spacing.

Spacing as aforesaid is, or may be entirely automatic when printing by sound in lieu of manual or telegraphic operation. The method made use of is one of differentiation between the time intervals between the pronunciation of successive letters and the pronunciation of successive words, or the differentiation of time intervals between syllables of the same word from the time intervals between successive words. There are two ways disclosed of accomplishing this differentiation. The first, embodied in Fig. 4, depends upon the presence or absence of the fundamental note of any pronounced sound. A special winding 28 is placed on transformer F, and operatively connected by special tuned circuit 29 and coherer co, with special relay 30 of the group Re. The circuit 29 is tuned to respond to the fundamental only. Consequently relay 30 is energized only when the fundamental tone is being sounded. Now by pronouncing words carefully in syllables, it will be observed that the cessation of fundamental tone in each case marks the division of the word into syllables, and furthermore marks the distinction between words. The fundamental ceases for a longer period between words than between syllables, and we can and do at will vary the difference in length between these periods, generally to increase the length of the period between words. This latter results in succinctness.

Now the time of deenergization of the relay 30 measures the length of these periods. Relay 30 controls a relay 31 of the spacing mechanism SM by a circuit from PB, conductor 32, contacts 33, conductor 34, relay 31, and to bus NB. Relay 31 in turn controls by circuit NB, armature 34', front contact 35, conductor 36, a relay 37, of what is commonly known to the art as the "slow relay type". This relay is provided usually with a copper sheath for its core, whereby the time of its release or falling back is increased. As is well known in the art this type of relay may be constructed and adjusted to fall back more or less rapidly. With respect to the time of falling back of this relay the time of cessation of the fundamental as measured by relay 30 is compared. Relay 31 also when it pulls up energizes locking relay 40 over circuit from NB, armature 41, front contact 42, conductor 43, relay 40 and to bus PB. Relay 40 locks up through conductor 44, front contact 45, conductor 46, (Fig. 2) normally closed contacts 47, on dash register device D of register PR conductor 48 (Fig. 3), normally closed contacts 49 on space register device D, conductor 50, normally closed contacts 51 on traverse register device D, conductor 52 to negative bus NB. Contacts 47, 49 and 51 are opened whenever devices D are energized, being of the character of contacts 47 shown in Figs. 6 and 7. Thus relay 40 (Fig. 4) when locked up is unlocked upon the registration of any one of dash, traverse, or space movements.

When relay 40 is locked up and relay 31 falls back a second locking relay 53 is pulled up from NB, armature 41, back contact 54, conductor 55, front contact 56 of relay 40, conductor 57, relay 53, conductor 58, (Fig. 2) (Fig. 1), left limit switch lm' when the same is closed and to battery PB. This relay 53 therefore is pulled up when relay 31 falls back when the left limit switch lm' of the carriage C is closed, and this switch is arranged to be closed whenever the writing reaches the marginal limit at the end of each line and throughout the right marginal space usually guarded by a bell for syllabilizing. Relay 53 locks up by conductor 59 to conductor 46 and over the same locking circuit as traced for relay 40.

Now relay 30, and hence relay 31, falls back each time the fundamental ceases, both between words and between syllables. Between syllables the interval of deenergization is too short to permit the slow acting relay 37 to release, but each time relay 31 falls back it partially closes the circuit of relay 53 at its back contact 54, thus continually testing for the marginal condition of closure for relay 53 brought about by the closure of limit switch lm'. Upon finding such condition, whether between words or between syllables, relay 53 is energized. Pulling up and locking itself it closes one circuit and partially closes another, the first from bus NB by front contact 60, conductor 61 (Fig. 2), bell relay 62, and bus PB, and the second from bus NB, through front contact 34' of relay 31, conductor 36, front contact 64 of relay 53, conductor 65 (Fig. 2), magnet rm of dash register D, to PB, thus registering a dash for printing after the latest syllable pronounced. Note that this registration takes place only when relay 31 pulls up when relay 53 has locked up on the marginal limit switch lm', but it does not always take place when these conditions are present.

If before relay 31 has pulled up, there has been time interval (during the absence of the fundamental tone) sufficient for slow relay 37 to drop back, this relay closes a circuit by its back contact 66, conductor 67, front contact 68 of the first locking relay 40, conductor 69 (Fig. 2) (Fig. 3) back contact 70 of relay 69$^a$, conductor 71, conductor 72 and magnet rm of the space register device spc, and to bus PB. Thus if there has been time for slow relay 37 to fall back a space is registered. The energization of the magnet rm of the space register opens contacts 49 in the locking circuit of relays 40 and 53, and they fall back, whereby when relay 31 again pulls up, the syllable register circuit previously traced is open at contact 64 of relay 53 and the dash register is not energized.

Relay 37, as aforesaid, is a means of measuring the time interval of cessation of dictation or of the fundamental as indicated by the time of deenergization of relay 31. Locking relay 40 functions principally as a means to enable the relay 31 to test for the marginal condition established by switch lm' on its back stroke only. In other words it functions as would a switching contact made by relay 31 in one direction only. Many forms of this are known and may be used. Relay 33 energized on the back stroke of relay 31 is an indicator of the existence of the test condition sought by relay 31.

To recapitulate, if when the test condition is indicated by relay 53, the interval of time permits relay 37 to fall back, the circuit 69 of the space register is closed and relay 53 deenergized, but if before this, the relay 31 again pulls up, the circuit 65 of the dash register is closed through contacts of relay 53 and the relay 53 thereafter deenergized by the opening of contacts 47 in the locking circuit. In dictation one has only to make the time intervals between syllables less than that taken by slow relay 37 to fall back, and that between words slightly greater, and spacing and syllabilizing will take place automatically.

Now resuming at the point where the space register becomes energized (Fig. 3) it will be noted that relay 69$^a$ is deenergized only when the marginal test condition of switch lm' is absent. Thus the space register is actuated only in the absence of the marginal test condition. When switch lm' is closed 69$^a$ is energized over conductor 58 and by conductors 73 (Figs. 2 and 3) to NB. This shifts armature 74 from back contact 70 to front contact 75 from which extends conductor 76 to the traverse register device D. Hence when relay 37 falls back with the printing on the margin, traverse is immediately registered instead of a space. This causes operation of the traverse motor TM without delay as will be later described to shift the carriage C to the beginning of the next line.

When relay 37 does not fall back, relay 31 on pulling up on the marginal condition as aforesaid registers a dash. As in the case of traverse this registration is printed in order immediately following the last letter of the preceding syllable. In registration when the marginal condition is present (not at other times) the dash register closes by front contacts 77 circuit from PB through switch lm', conductor 58, conductors 78 and 79 (Fig. 3) relay 80 and conductor 81 to NB. Relay 80 locks itself to battery PB by conductor 82 through contacts 83 on traverse register device D, and partially closes by contacts 84 the circuit of the traverse register D through conductor 85 from conductor 76, conductor 86 (Fig. 2), and back contact of dash register D to battery NB by conductor 87. Thus when a dash marks a syllable on the margin, traverse is registered upon the falling back of the dash register, and the carriage C is traversed immediately upon the printing of the dash, as it should be, to the beginning of the next line.

Now the dash is a mark of punctuation, and as such is representative of its class. Although limited space prohibits the showing, it is intended that the registry of any mark of punctuation marking the termination of a syllable, word, or numeral, and the like, shall cause the succeeding registry of the traverse of the carriage C to the beginning of a new line. To this end the register circuits and devices of the said other punctuation marks will be associated whenever found desirable, with the circuits of the traverse register in the manner described in connection with the dash register.

There are some cases in which this association will be unnecessary on account of the occurrence of a space interval immediately following the dictation of the mark (for they may be printed by sound as well as words), the timing relay 37 then registering traverse instead of space as previously set forth.

Obviously in the absence of the marginal test condition and the printing in the body of the lines, while the relay 31 continuously tests for the marginal condition, no syllables are marked as a result of such test, for relay 53 is deenergized until the marginal condition is found. On the other hand whenever timing relay 37 measures a space interval it closes by conductor 69 independently of relay 53, the circuit of the space register D through the back contact of the now deenergized relay 69$^a$ as traced above.

It has been said the bell relay 62 (Fig. 2) furnishes a guide to the dictator as to marginal shifting. This relay upon being energized by relay 53, closes one circuit, opens another and locks itself up. The first circuit is that of the bell magnet 88 extending from PB through front contact 89 by conductor 90 to the magnet and thence by conductor 91 to NB. The circuit opened is the bus PB of the letter registers D, and the opening is at back contact 92. The locking circuit is by front contact 93 to conductor 94 (Fig. 1) to normally closed contacts 95 on the right hand limit switch $lm$, and to NB (disregard for the moment loop 168). Thus relay 62 remains locked up until the carriage C is shifted to the beginning of the new line whereupon it is unlocked. It should be mentioned by the way that the line feed is accomplished by the traverse action as in the standard Oliver machine, or else may be accomplished through the actuation of the line feed mechanism $Lf$ shown by closing its circuit by special contacts controlled from the traverse register, the circuit 144 of the traverse motor or switch $lm$. It may also be mentioned that the points of operation of the switches $lm$ and $lm'$ may be adjusted at will through adjustment suitably provided for any of the associated parts as may readily be done by the skilled engineer in accordance with the already known marginal adjustments of standard typewriting machines.

Hearing the bell 96 rung by magnet 88 (Fig. 2), the operator dictates the next syllable or the next word as if nothing had happened and then stops. The letters of this next syllable or word are not registered, because bus PB is open at contact 92. Their pronunciation however enables relay 37 (Fig. 4) to measure the time interval and determine the syllabilizing and spacing. This latter being accomplished, when relay 62 falls back it closes by back contact 97, and conductor 98 (Figs. 3 and 4) the circuit of another bell 99 of the same or different tone from the bell 96, whereby the operator is advised to proceed dictating, which he does by beginning at the point in his dictation where the first bell 96 sounded. The bells follow each other of course in quick succession.

*Punctuation.*

Punctuation marks are dictated to the machine and registered and printed by sound, as are words themselves. This is accomplished by series circuits closed through contacts of a plurality of devices D, those entering into the combination in any case being a portion or all of those letter registers spelling the name of the punctuation mark. Thus for a semicolon, the registers of letters SEM, etc., would figure in total or in part.

Referring to Figs. 2, 7 and 8, it will be seen that a number of registers D of the primary mechanism PR contain normally open sets of contacts 100 electrically insulated from each other. These may be mounted like contacts 47. Series conductors 101 are each completed by the closure of a plurality of sets of contacts 100. Conductors 101 extend from devices D not to windings $w'$, but to windings $w^2$ of actuating magnets Am (Fig. 1), windings $w^2$ being connected with a special bus PB$'$ separate from that PB associated with windings $w'$. The bus PB$'$ is normally open at contacts 102 controlled by figures magnet Fs while the bus PB is normally closed at contacts 103 controlled by the same magnet. Thus normally when registers D are actuated in word dictation windings $w'$ are energized one from each individual register as aforesaid, over circuits 15, the closure of any one of the series circuits, 101, being without effect owing to the break in bus PB$'$ at 102. When numerals or punctuation marks are to be printed however, the FIGS key (Fig. 3) is pressed down, whereupon Figs. magnet Fs becomes energized over a circuit presently to be traced, closing 102 and simultaneously opening 103. Windings $w'$ and circuits 15 are now disabled and windings $w^2$ and circuits 101 enabled.

Now the magnets $sm'$ etc., of the trunk distributer DD, which are energized normally over circuits $20^1$—$20^4$ under control of the individual registers D, are shifted by magnets Fs from circuits $20^1$—$20^4$ to circuit 104, under control by switch 105 of the control switch RD (Fig. 1.) Switch 105 comprises a wiper 106 stepped over contacts 107 connected commonly with circuit 104 which circuit puts battery PB on magnets $sm'$ of distributing device DD (Fig. 2). The magnets $sm'$ are thus energized singly, as the device RD is stepped by closure of circuit 21 (Fig. 1). The devices D are thus shifted from one trunk to another only upon the energization of the printing magnets $w^2$. Thus the several letter registers D (as for instance SEM and I governing the circuit of semicolon printing magnet $w^2$) all pull up on the same one of the trunks $t'$ to $t^4$, which is as it should be for proper control through master switch RD.

It is particularly to be noted that figure characters and not capital letters are printed in this manner and further that any desired figure character whatsoever may be dictated to the machine and, assuming that the vocal attachment is even measurably operative, will be printed properly by it, the essential requisite being that each register combination shall be different from each other, and that each of the series circuits 101 shall be maintained electrically separated from each other.

To this end it is best that no single pair of contacts 100 be used in more than one circuit 101, duplicate pairs 100 being provided on each device D (see Fig. 7) when needed and all actuated simultaneously in the same manner.

When the FIGS key (Fig. 3) is pressed to print the dictated figures, the circuit of the Figs. shift magnet Fs is closed as follows. FIGS key (Fig. 3) from bus NB of the keys, conductor 129, Fig. register device and battery PB. The Figs. register pulling up closes directly the circuit of figures shift magnet Fs from trunk $t'$ (or $t^2$ to $t^4$) corresponding contact O' of tiers $e^1$ to $e^4$ (see also Figs. 6 and 7), (all second contacts $O^1$ to $O^4$ of tiers e are connected in multiple to conductor 130, as to conductors 15 of the character actuating magnets), conductor 130, Figs. 6 and 1, magnet Fs, and battery bus PB, thence to bus NB at distributing switch ds, Fig. 1, wiper $16^a$, contact 16 and trunk $t'$ (or $t^2$ to $t^4$) back to contact O' of the FIGS register of Fig. 3. When the FIGS key is released, the platen is at once returned to normal position, and the restoration of all circuits to normal effected.

*Automatic caps.—Shift from period.*

Whenever a period is printed the registration of a space and then of a capital for the beginning of the next sentence automatically follows. Upon the energization of circuit 101 of the period printing magnet 108 (Fig. 1), a relay 109 in series with printing magnet 108 is pulled up. This relay closes two circuits from bus NB, the one 110 from contact 111 and the other 112 from contact 113. The first 110, extends through Fig. 6 into Fig. 3, and thence through normally closed contacts 114 on a relay 170 (presently to be described) to relay 116, and to PB. The second circuit (112) from relay 109 extends likewise through Fig. 6 to Fig. 3, and thence through a relay 117 to PB. Relay 116 of the pair 116, 117 being energized closes a locking circuit 118 for itself through front contact 119 and back contacts 120 on the space register SPC. Relay 116 also closes the energizing circuit of the space register by its front contact 121 and conductor 122 connecting with conductor 72 previously described. Thus a space is automatically registered, and properly printed after each period. Promptly upon registration of the space the locking circuit 118 is broken and relay 116 returns to normal.

But relay 117 having become energized over circuit 112, closes by one of its front contacts 123 a locking circuit 124 for itself extending through normally closed contacts on the CAPS register, and thereby not opened until the CAPS register pulls up. By its other front contact it partially closes circuit 126 of Caps. relay 125.

The operation of the space register SPC after a period, completes circuit 126 at contacts 127. Thereupon relay 125 pulls up, locks itself by 128 over circuit 124 previously traced, and closes circuit 22' of the CAPS register, upon the energization of which both relays 117 and 125 are unlocked and fall back. All this takes place in a moment of time, but nevertheless in the orderly sequence set forth. Thus space following a period is registered on one trunk $t'$ to $t^4$ and capitals on the next succeeding just as in the case of letters and figures.

It is to be understood that although not shown in every case for the sake of clearness, every actuating magnet $w^2$ energized from the primary register PR contains a pair of contacts in multiple with those bs on loop 21 (Fig. 1), whereby the distributer switch RD is actuated one step for each energization of any such magnet.

The Caps. register CAPS closes upon the then waiting trunk $t'$ to $t^4$ a circuit through conductor 22 (Figs. 3 and 6 then Fig. 1) to caps shift magnet Cs. Upon the actuation of the spacing magnet Sd (Fig. 1) and which by the way is energized over a circuit 131 from the space register SPC, Fig. 3, Fig. 6, and Fig. 1, following the printing of the period, the ensuing step of device RD energizes caps magnets Cs over the associated trunk $t'$ to $t^4$. Cs shifts the carriage C (the basket of type bars, or the equivalent) through connection 132 with abutment 133, preferably separate from connection 134, and abutment 135 actuated by Fs. Unlike Fs however Cs does not break the normal connections of PB, for circuits 101 are not to be used at this time, simple capitals and not figures being desired. Magnet Cs does however close a locking circuit 26, 27 for itself through back contact 23 of the relay 25 in the battery lead of loop 21. Thus magnet Cs is therefore locked up only until the first letter is printed, whereupon relay 25 unlocks its circuit at 23, 24, and the carriage C drops back to normal position for small letters and the next letter printed will be a small letter. Relay 25 should be a fast relay as compared with actuating magnets $w'$ and $w^2$.

When all caps are desired it is only necessary to press and hold down key AC (Fig. 1) which key breaks the locking circuit 26, 27 and independently closes the circuit of Cs by a path including conductor 139.

Space from comma.

Having traced the circuit entering into the automatic spacing and capitalizing following a period, (and for any other sentence terminal mark, as for instance question mark and exclamation mark), the circuits whereby spacing automatically follows a comma (or other similar subordinate marks, as for instance, semicolons, colons, dash, apostrophe, quotations, parentheses, etc.), may be readily traced. Referring again to Fig. 1, the relay 140 by the side of relay 109 is in the circuit 101 of the actuating winding $w^2$ of the comma type bar COM. When this circuit is energized to print a comma, relay 140 closes by its contact 141 circuit 110 (previously traced to relay 116) in the same manner as does relay 108. Thus a space is registered and the machine operated one space immediately following the comma (or other subordinate mark), the circuit connections being the same as in case of space following the sentence terminal marks. There is provided one relay 140 for each circuit 101 of a subordinate mark, but no additional relays 116 need be provided, the relays 140 commonly controlling relay 116 by contacts 141 wired thereto in multiple. The same is true of relays of the type of 109 as respects relays 116 and 117.

Line feeding.

Line feeding is accomplished automatically at the end of each line, wherever that line terminates at the right margin of the page or not too close to the left margin. When it terminates at other points it may be manually brought about (or automatically, as heretofore mentioned). In the first instance it results directly from the traverse of the carriage, as in the Oliver machines, and this instance will be described in connection with the automatic traverse of the carriage. In the second instance it is brought about by the pressure of the line feed key (LINE) (Fig. 3). This closes circuit 142 to the line register. In a manner entirely similar to that of the other registers the line register closes a circuit from one of trunks $t'—t^4$ to conductor 143 (Figs. 3, 6 and 1), and to the line feed magnet $Lf$ (Fig. 1), which magnet is energized in turn and steps the platen the proper distance. Magnet $Lf$ has contacts (not shown) similar to contacts $bs$, closing loop 21, as indeed do all devices actuated through register PR, the actuating magnets $Am$ being an example. Operation of the magnet $Lf$ may be made direct from the line key as in the case of the Figs. magnet Fs if desired. Operation through register PR simply prevents possible untimely operation by the dictator, since when operated through the register, the printing of already registered dictation necessarily precedes any line movement of the carriage. In case of any control where it is desired to prevent untimely operation, the control may be carried through a device D of register PR instead of being exercised direct from the control key.

Traversing.

Traversing is automatic from all points lying on the right hand margin of the sheet. In connection with the automatic spacing described on page 16, the manner of closing of the circuit of the traverse register when relay 37 (Figs. 4 and 5) falls back with the printing on the margin was disclosed. The traverse register is automatically substituted for the space, through the energization of relay 69$^a$ (Fig. 3) from the marginal switch $lm'$ (Fig. 1). The traverse register closes the circuit of conductor 144 to one of trunks $t'$ to $t'$. Conductor 144 leads through Figs. 3, 6 and 1 to traverse motor $Tm$, and $Tm$ becomes energized immediately after printing of the last letter of the syllable or word, or of the punctuation mark, to traverse the carriage. The traverse continues to the extreme left margin whereupon the limit switch $lm$ (Fig. 1) is operated by the end of shaft $s$ or any other projection from the carriage, and conductor 144 is opened at contacts 145 (or through any suitable relay) and motor $Tm$ stops. This opening of the motor circuit should take place just preceding the bringing up of the carriage against the usual marginal stops so that the inertia of the moving carriage may be in part spent before striking the stops. Additionally braking means may be used if desired.

While traversing at the margin is automatic, traversing to a new line from any point of a given line, as for instance when a sentence ends intermediate the ends of the line, may be manually brought about by simply pressing the traverse key, TRAV of Fig. 3. The pressure of this key closes the circuit of the traverse register, with identically the same result as previously described, the traverse of the carriage (or basket of type bars) to the beginning of a new line.

Paragraphing.

The paragraphing key PAR of Fig. 3 also has to do with the traversing of the carriage, but instead of stopping at the beginning of a new line, the carriage is stopped finally short of the beginning of the new line in order to define the paragraph as usual.

Referring to Fig. 3, it will be seen that pressure of the PAR key closes two circuits to battery PB, the one, 146 and 76, to the traverse register which produces traverse of the carriage, and the other, 147, to relay 148. Relay 148 pulling up locks itself through contact 149 from battery NB, by conductor 150 (Fig. 6), normally closed pair of contacts 151 carried on oscillable shaft 152, conductor 153, and back to relay 148. By its contact 154, relay 148 closes circuit 155 (Figs. 3, 6 and 1) to normally open contacts 156 on right limit switch $lm$, thence by conductor 157 (Figs. 1 and 3) to magnet 158, the armature of which 159, is connected to oscillable shaft 152. As soon therefore as the traverse has been completed magnet 158 is energized and rocks shaft 152 to bring abutment 160 and the contact 151 into the path of the end of shaft $s$ (same as shaft $s$ in Fig. 1) or any other projection from the carriage C. Magnet 158 at the same time releases carriage C for movement to the left until shaft $s$ engages stop 160. The said releasing mechanism is not shown, but is intended to be the same as or the equivalent of the well known release of the tabulating mechanism used in all machines today, and stop 160 and its companion stop 161 correspond in function to the tabulating stops. Any of the well known tabulating mechanisms may be used, magnet 158 simply constituting the actuating element. Stop 160 defines the paragraph position of carriage C, and when that stop is engaged by shaft $s$, normally closed contacts 151 in locking circuits 150, 153 are opened, and paragraph relay 148 (Fig. 3) is deenergized, thus opening the circuit of paragraph magnet 158. It will be noted that magnet 158 closes a locking circuit 162 for itself in shunt to contacts 156 of switch $lm$, thereby remaining energized until stop 160 is engaged by shaft $s$. In some tabulating release mechanisms this will not be necessary.

Relay 148, Fig. 3, during the time of its energization, also maintains closed contacts 163 which put battery NB upon conductor 177, contact 176 of relay 170, and one side of loop 168 extending (Figs. 3, 6 and 1) to conductor 94. Conductor 94 is that conductor over which the locking circuit of register disabling relay 62, Fig. 2, is closed. Loop 168 including in series contacts 163$^a$ of 148 and 176 of relay 170 is normally in series with contacts 95 on switch $lm$, and thus the relay 62 is not deenergized and the register PR restored to normal until the paragraphing is complete and the locking circuit 94, 168, is broken at contacts 163 of relay 148 (Fig. 3). It will be observed that the locking circuit 94 is normally completed by way of loop 168 (Figs. 1, 6 and 3), normally closed by back contact 163$^a$ on paragraph relay 148 and back contact 176 of relay 170. 163$^a$ being opened and 163 closed when 148 is energized the control of circuit 94 is transferred from 95 to $lm$ to contacts 163 of 148, for 163 is well opened before 163$^a$ is closed.

*Subscribing.*

Subscribing is accomplished in a manner similar to paragraphing. The subscripture key SUB (Fig. 3) is pressed with the result that traverse register device Tr is energized over conductors 169 and 76, and the subscripture relay 170 is energized over conductor 171. Relay 170 through contact 172 closes a locking circuit 173 for itself, which locking circuit extends through normally closed contacts 174 in switch ES' of the initialing device IM, Fig. 3. Upon the final step of this switch, the switch arm 175 engages and opens contacts 174, thus unlocking relay 170. Before this however both the subscripture and the initialing will have been completed as will be seen.

By its contacts 176, relay 170 closes locking circuit 168, 94, etc., of the register, disabling relay 62 as previously traced in connection with the paragraph relay 148, contact 176 transferring the control from the limit switch $lm$ to subscripture relay 170 as did contact 163 of relay 148. By its contact 178 it puts battery NB on conductor 179 which parallels conductor 155 (Figs. 3, 6 and 1) to normally open contacts 180 on left border switch $lm$, thence by conductor 181 (Figs. 1 and 6) to subscripture magnet 182, associated with shaft 152 in the same manner, and functioning in the same way as paragraph magnet 158 just described, with the exception that the subscripture magnet 182 oscillates shaft 152 in the opposite direction from magnet 158 carrying stop 160 and contacts 167 out of the path of shaft $s$ of the carriage and stop 161 and contacts 165 into the path thereof. Thus when the subscripture magnet 182 is energized after traverse of the carriage C to the left border, the carriage is released for movement past paragraph position to the subscripture position defined by stop 161. On account of lack of space these stops are shown at the right of the carriage C, but acting as they do upon movement of the carriage to the left, they would in practice be located to the left. Magnet 182 locks up by 182$^a$, 182$^b$ to 164 but when stop 161 is engaged contacts 165 are also engaged and opened, breaking the locking circuit 164, 168, 94, of register control relay 62 (Fig. 2) and also deenergizing magnet 182, thereupon shaft 152 returns to normal and dictation may be proceeded with.

Relay 170 by contacts 114, previously mentioned, shifts circuit 110 of the period relay 116 to conductor 183 which connects with conductor 76 of the traverse register. This is of no immediate effect since circuit 110 is open at relay 109, Fig. 1, the relay 170 not having been pulled up until after the printing of the last period.

By contact 184 of relay 170 a conductor 110 is connected to branch conductor 185 leading to a relay 186 and to battery. By contact 187 battery NB is put upon conductor 188, open normally upon contact 189 of relay 186 and by 190, 190$^a$, 191 to magnet 192 of ES'.

The operation is as follows: Upon the initial pressing of the key SUBS, the relay 170 is pulled up over conductor 171 and at the same time traverse registered over conductor 76. Traverse to left border ensues. Switch $lm$ then stops traverse, and at contacts 180 closes the circuit of magnet 182 which results in release of carriage C to subscripture position, as described. Thereupon magnet 182 is energized, and locking circuit 164, 168, 94 of relay 62 broken. Bell 99 having sounded, the subscripture is dictated. Since caps for the first letter automatically follows a period, the first letter is a capital. A comma is dictated following the subscripture as usual. The comma relay 140 closes circuits 110 to battery NB. This results in energizing relay 186, over conductor 185 and also in registering traverse over conductors 183 and 76. Relay 186 locks up over conductor 186$^a$, through contacts 174 of switch ES' (Fig. 3) along with conductor 173 of relay 170. Traverse ensuing, switch $lm$ this time closes the starting circuit 188, 189, 190, 190$^a$, 191 to magnet 192 of device ES', Fig. 3, circuit 181 having been broken at contacts 181$^a$ of relay 186. Switch ES', stepping, prints the initials in caps as subsequently described, and upon the last step thereof locking circuit 186$^a$ of relay 186 and locking circuit 173 of relay 170 are broken. Switch ES' automatically stops itself and is thereupon ready to be started again. During this period the initials of the dictator are printed in capital letters, for after each capital comes a period which results in automatically setting up caps again.

Paper feeding.

Just after the printing of the last period of the initials, switch ES' may close the circuit of the paper feed magnet, whereby paper feed to the next position is automatic. However, this may be accomplished by hand as follows: The FEED key of Fig. 3 closes circuit 194 of the FEED register at the extreme right of Fig. 3, and this register closes the circuit 195 (Figs. 3, 6 and 1) of the feed relay 196 of the pair 196, 197. This relay through armature 198 closes circuit 199 of the paper feed motor P$f$. This motor rolls the platen through gears $g$ and feeds the paper until a perforation $p$ permits brush $b$ (Fig. 1, left) to close circuit 200 of the relay 197, which rocks armature 198 the other way and opens circuit 199 of motor P$f$. (Any suitable braking means or circuits may be employed with the motor P$f$, as indeed with any other motor of the system.) Perforation $p$ marks the headline of a new sheet, and in feeding to this position the foot perforation $p'$ of the written sheet has been passed over, but since this controls circuit 201 in parallel with circuit 195 of relay 196, the feed is not stopped until the headline of the new sheet is reached.

In cases where there are more sheets than one and the first sheet is filled completely, perforation $p'$ comes into play through $b'$ and 201 to automatically start the feed motor P$f$ for feeding to the next sheet, whereon the motor P$f$ is stopped through perforation $p$ as just described. This feed may be manually brought about at the end of any writing irrespective of subscripture, etc.

Line feeding.

If the amount of feeding desired be less than the remainder of a sheet, the line feed key "LINE" may be pressed in rapid succession to feed the paper the desired distance. This acts through conductor 142 and the "line" register D to close the circuit of magnet L$f$ over conductor 143. As in case of actuating magnets A$m$ and all other devices actuated through register PR, the magnet L$f$ is intended to actuate suitable contacts functioning as contacts $bs$ to step distributing switch $ds$.

Initialing addressee on plural numbers of pages.

This is accomplished through the secondary register SR, Fig. 2. Upon this register are registered the capital letters of the first line of the writing on the first page only. This first line in a letter is the name of the addressee. When the paper is stopped at the beginning of a sheet by energization of magnet 197 over circuit 200, magnet 202 in circuit 200 partially closes series circuit 203, putting battery on registers D of the secondary register SR. This circuit 203 is completed at contacts 203$^a$ by the energization of caps shift magnet C$s$, and through limit contacts $k$, $g'$ on page numbering switch P$s$. These contacts are closed (see Fig. 23), when switch PS is at normal or first page position only. At other positions the arm 210 having moved away they are open. Therefore the secondary register SR is energizable only on the first line of the first page for the registration of capital letters only, the series circuit 203 being closed each time the caps magnet C$s$ is energized. Thus the first letter of each name of the address is registered, one on each trunk $t^5$ to $t^8$ in succession. The circuits 205 of registers D of secondary register SR are connected in multiple with the devices D of the primary register PR to circuits 14 at points 206. Also conductors 15 of the letter actuating magnets $w'$ are multiplied to contacts $O'$—$O^4$ of SR. There is a device D in the secondary register SR for each device D of a letter character in the primary register PR. Thereby any letter character whatsoever may be registered on register SR.

Distributing device $DD^2$ and actuating switch $DS^2$ act in the same relation to trunks $t^5$ to $t^8$ as do distributing device DD and switch $ds$ of trunks $t'$ to $t^4$. But switch $DS^2$ acts only upon the first line of pages succeeding the first. This is brought about in the following manner:

The armature $202^a$ of relay 202 (Fig. 1) when relay 197 is energized over circuit 200 momentarily closes on its up-stroke (but not thereafter on its down-stroke) contacts 207, of circuit 208, thus putting battery on stepping magnet 209 of switch $DS^2$, through now closed contacts 210, 211 of page numberer PS. Relay 197 is energized only at the beginning of a page. Contacts 210, 211 are closed only after switch PS makes one step. Thus at the top of the second and succeeding pages switch $DS^2$ is started, but not on page No. 1. Started it closes by switch arm 212, arcuate contacts 213 in circuit with constantly rotating interrupter $In$, which results in stepping switch $DS^2$ once for each revolution as well known in this type of stepping switch. Thus one by one trunks $t^5$ to $t^8$ are connected to battery and the actuating magnets $w'$ are energized to print the initials registered on register SR.

Alternating with contacts 214 connected respectively with trunks $t^5$ to $t^8$ are contacts 215 connected commonly to conductor 216 which leads to the period actuating circuit 101 of Fig. 1. Thus switch $DS^2$ in its stepping alternates the printing of periods with the initials of the addressee as should be. The switch alternates steps to 214 and 215.

After the last period the arm 212 of switch $DS^2$ steps off of the arcuate contact 213, thereby automatically breaking the circuit of its stepping magnet 209 until closed again at the beginning of a succeeding page. Switch $DS^2$ is shown as provided with two sets of contacts 214, 215, 213, in multiple and alternately used. Multiple sets may be similarly provided in any switches shown. This is well known.

The devices D of secondary register SR are not released as the characters are printed as in case of devices D of register PR, but are retained in actuated positions until the final page is written, as will hereinafter appear.

Page numbering.

The page numbering switch PS (Fig. 2) is associated through contacts 217 with the circuits of a series of registers (2) (3), etc., in register SR. Normally its arm 210 rests free from contacts 217. Whenever relay 196 (Fig. 1) is energized to shift to a new sheet, however, relay $201^a$ (Fig. 1) closes circuit 218 of stepping magnet 219, thus stepping switch PS one step over the first contact 217 and to a point between No. 1 and No. 2, whereupon devices (2) (3) etc., being permanently connected to common conductor 220, the first one of the series, to-wit, (2) is energized. Switch PS is retained in this position (shown in dotted lines Fig. 23) between contacts 217 by holding pawl 221 against the tension of a spring 222, drawing it toward normal. Upon the last page of a writing however the pawl 221 is withdrawn by magnet 223 which is energized and retained energized when the subscripture key has been pressed, until the head of a new sheet has been reached. This is accomplished by a locking circuit 224 for the release magnet 223, which locking circuit 224 is closed through normally closed contacts 225 in relay 226, energized on the first line of the first page from control feed conductor 203 of register SR. The initial closure of circuit 227 of relay 223 is accomplished directly from the subscripture key SUB (Fig. 3) by contacts $227^a$ connecting to NB.

The next to the last contact 214 of each bank of switches $DS^2$ is connected not with a trunk $t^5$ to $t^8$ but with a special trunk $st$ connected commonly with contacts 100 of devices (2) (3), etc., which are connected with numeral trunks 101 in parallel with contacts 100 of register PR. Thereby after the last initial of the addressee is printed the page number, 2, 3 or 4, as the case may be, is printed.

Simultaneously with closure of the period circuit following this arm 212 closes by contact 228 release circuit 229 of release magnet $mo$ of the number registers (2) (3), etc. Thus each register device of group (2) (3) is released soon after the page number registered has been printed, whereby upon the operation of switch $DS^2$ upon succeeding pages, the numbering is appropriate.

The timing and distance of the steps of switches $DS^2$ and PS may be made anything desirable or suitable to meet operating conditions. Both of these types of switches are well known in the art of telephony and telegraphy.

The release of the letter registers by magnet $om$ is effected in conjunction with the release of page numbering switch PS over the same circuits, the circuit 230 of release magnet $om$ being connected in parallel to the circuit 227. Release circuit 231 to release magnet 232 of distributing device $DD^2$ is also closed in parallel with 227. Device $DD^2$, unlike DD is returned to a determinate normal by a spring 233, as in case of cams $c^2$ in the devices (2) (3), in the absence of a multiple number of contacts, there being provided only one pair 100 in each case associated with the common special trunk $st$.

Dating.

When the release circuit 229 is closed by switch $DS^2$, there is closed from the same contact 228 the starting circuit 236 (Figs. 1 and 6) of the dating mechanism DA Fig. 6). Stepping magnet 237 is in circuit 236, and upon this momentary energization steps switch ES one step whereupon it continues stepping of itself by virtue of the closure by arm 238 and arcuate contact 239 of the circuit 240 of magnet 237, upon continuously rotating interrupter In or the equivalent. Switch ES thus steps until it again slips off the arcuate contact 239 whereupon the circuit 240 is broken.

During this stepping switch ES closes successively through arm 238 and contacts 241 of its banks (of which there are two shown as in case of switch $DS^2$, the number of such banks being merely a manner of convenient relation of the length of the step of the switch to the number of the steps) the circuits of trunks $ns$, which are connected respectively with arms 242 of number switches $Ns$. These arms, as previously described, may be swept over contacts 1, 2, 3, etc., up to 10. Contacts 1, 2, 3, etc., are connected in multiple to conductors $d'$ to $d^9$ and $d^0$, which are connected to actuating magnets $w^2$ (Fig. 1) in multiple with conductors 101 of the figure register circuits. Thus as switch ES steps, the circuits of six (or a less number) actuating magnets are successively closed. The particular circuits closed depends upon the setting of arms 242 of switches $Ns$. As shown beginning with switch $Ns$ on the left, the arms 242 rest on the following buttons (off), 2, (off), 6, 1 and 3, this actuating in succession magnets $w^2$ to print 2613. However, between each successive pair of contacts 241 are contacts 243, connected commonly to a special conductor 244 leading to the hyphen or dash printing magnet $w'$. Thus a hyphen is printed between each pair of numerals represented by switches $Ns$. Thus the 2613 above referred to would be printed as 2/6/13, representing the date of February 6, 1913. So by appropriately setting arms 242 any date whatsoever may be printed. Thus for date of December 29/13, the arm 242 of the first switch $Ns$ (from the left) will be set at the first button, the second at button 2, the third at button 2, the fourth at button 9, the fifth at button 1, and the sixth at button 3. Switch ES will effect the printing of these numerals in the following form: 12/29/13.

During the time of printing of these numerals the circuit of the figure shift magnet Fs is closed through arm 238 and contact 239 over circuit 245, 130, branching from 240. At the ninth step of switch ES it passes over contact 246 and onto the blank space $246^a$ putting battery NB on contact 246 and conductor 247, which conductor leads to conductor 76 (Fig. 3) connected with the traverse registers TRAV. Thereby traverse of the carriage C to the left border is registered and ensues as previously described.

When stepping magnet 237 of switch ES is first energized over circuit 236 ($DS^2$ may make a special final step for this before stopping), a circuit 250 may be closed to subscripture magnet 182, through normally closed contacts 165' thus resulting in a removal of the date from the initialing and page numbering to a point near the right border of the page, for the energization of the subscription magnet 182 results in immediate shift of the carriage to that position.

If desired additional contacts may be provided in connection with 165 to initially close the circuit of 237 (as shown in Fig. 20) and direct connection of 236 with 237 omitted, or else switch ES may be given one or more false steps to allow time for the complete shifting of carriage C to subscripture position before the printing of the date.

The initialling of the dictator.

Reverting now to the subscripture relay 170 (Fig. 3) it will be seen that when this relay is energized it closes conductor 110 from the comma relay (Fig. 1) upon conductors 183 and 185. Conductor 183 energizes the traverse register TRAV through its connectiton with conductor 76, while conductor 185 energizes relay 186, which locks up by conductor $190^b$ (Figs. 3, and 6), through normally closed contacts 174. Traverse after the subscripture having ensued, circuit 190 preliminarily closed by contacts 189 of relay 186 is completed by contacts $190^a$ of limit switch $lm$ (Figs. 3, 6, 1 and 6) thereby energizing magnet 192 and stepping switch ES' its initial step, thereafter it steps of itself by reason of the closing of the circuit of 192 thru arm 175 and arcuate contact 254. Thus it carries its contact arm 175 step by step over contacts 255, connected to trunks $is$ leading to the arms 256 of switches $Is$ of the initialing mechanism $Im$. The arms 256 of switches $Is$ are each associated with twenty-six buttons connected respectively in multiple with twenty-six conductors $n'$ to $n^{26}$ leading each to an actuating magnet $w'$. By setting the arms 256 to desired buttons any desired set of initials whatsoever may be printed. They are all printed in capitals because of the energization of the caps magnet $Cs$ by conductors 257 and 22 from arm 175 and arcuate contact 254.

Preferably there are provided alternating with contacts 255 contacts 258 which are connected commonly to conductor 259 in multiple with conductor 244 leading to the hyphen, dash or period magnet of the group $w'$ or $w^2$. Obviously the printing of the initials will be then after this fashion C/S/W, C. S. W., or C—S—W. The punctuation may be omitted if desired. When switch ES' reaches its last step, arm 175 is stepped off contact 254 and the switch stops in this position temporarily, opening locking contact 174 and releasing the subscripture relays 170 and 186.

Simultaneously switch ES' closes momentarily the contacts 260 closing thus the circuit 261, connecting with conductor 195 leading to paper feed magnet 196 and thus bringing about an automatic feeding of the paper to the beginning of the next sheet. Also the circuit 262, 247, 76 of the traverse register is closed bringing about an automatic traverse to the beginning of a new line.

*Letter writing.*

With the above description of the details of the system by which the method of my invention is carried out, the high efficiency and economy in the operation of my invention for code printing by sound will be readily apprehended and appreciated. The operation will be described with particular reference to a letter, one or more pages in length, which letter may be but one of several hundred letters of the same size and type which may in the aggregate constitute a day's correspondence.

Coming to the machine the operator closes the switches 270 and 271 (if the same have not already been closed), thus starting up the motor generator set MG and placing power therefrom upon buses NB and PB. Pressing the caps key CAPS (Fig. 3) he dictates into the transmitter T' (Fig. 4) the abbreviated title of the party addressed. Assume that this is "Mr.", as usual. The first letter "M" is recorded as a capital, whereupon carriage C is released from the position in which it was placed through the pressure of caps key Cs, and the next letter is written in small type. Now pressing the figures key FIGS of Fig. 3, the word "period" is dictated into transmitter T', resulting in the record of a period through the energization of a plurality of registers of the group PR closing the circuit 101 of the period actuating magnet. Each of these keys CAPS and FIGS are but momentarily pressed. The first name of the addressee is dictated in quick succession, and printed with its first letter a capital by reason of the fact that a period and a space followed the dictation of the title. Pressing the caps key CAPS, the last name is then dictated, and again pressing the figures key FIGS, the word "comma" is dictated, resulting in the placing of a comma after the fully written name of the addressee. This requires but four acts upon the part of the operator, pressing caps and figure key alternately in ready succession twice.

In the act of recording the comma, the circuit of dating magnet 237 and subscripture magnet 182 are closed by magnet 140 in the circuit of the comma actuating magnet $w^2$ (through contact 141$^a$ and contact of relay 140$^a$ closed only when 208 is energized by 202 on the first line), resulting in the immediate shifting of the carriage C to the left to the subscripture position defined by stop 161. At this point switch ES records at the right hand side of the top line of the sheet the date which is set up upon the switches Ns. At the end of the dating operation switch ES closes the circuit of the traversing register TR over conductor 247, whereupon the carriage is traversed to the right. The address is immediately dictated and recorded. Commas do not now energize 237 for the first line is passed and 202 is deenergized. The figures key is pressed whenever a punctuation mark is dictated, and the caps key CAPS is pressed just before dictating any word not following a period and which it is desired to commence with a capital letter.

Pressing the paragraph key PAR, the carriage C is first traversed to the extreme right again and then released by the energization of magnet 158 (Fig. 6) for travel to the paragraph position, whereupon dictation may proceed with the same rapidity and in the same manner as dictation to a stenographer at the present time, the only difference being that the emphasis of the syllables is made perhaps slightly greater than is usual, the time interval between syllables being made slightly longer. The essential point in the operation is that the emphasis of spaces between words shall be made greater than the emphasis of syllables through the permitted lapse of a longer time interval. With a few hours' practice one can readily familiarize himself with this little peculiarity in dictation. Whenever punctuation marks or other figure characters are to be recorded, the figure key FIGS is momentarily pressed, just in advance of the dictation of the mark. After periods, a capital letter for the first word of the following sentence is set up automatically. At other times the operator has only momentarily to press the caps key CAPS as heretofore indicated. At the end of a line traverse takes place automatically, and automatic differentiation is made by the spacing mechanism SM between syllables and spaces, with the result that syllables are properly marked by dashes. There is no confusion or misdivision of syllables at the ends of lines, for the reason that traverse ensues only upon the occurrence of a syllable, a space or a figure character.

Whenever a paragraph is desired, the operator has only momentarily to press the paragraph key PAR, and upon the shift of the carriage C to resume dictation. Upon the registry or commencement of each carriage shifting movement, bell 96 (Fig. 2) is tapped, warning the operator to cease dictating until the movement is completed. At the end of the first page of the dictation, the proper feed to the next page follows automatically by reason of the engagement of brush $b'$ through perforation $p'$ with contact $t$. This results in the energization of the paper feed motor Pf, and the engagement of contacts $b$ through perforation $p$ results in stopping the feed at the first line of a new sheet. Immediately the initials of the addressee, which were registered upon the auxiliary register SR in the dictation of the name on the first line of the first sheet are recorded by the operation of the secondary distributing switch $DS^2$, the operation of which is initiated over conductor 208. Following this the number of the page is also recorded by the operation of the same switch $DS^2$, and at the end of its operation switch $DS^2$ closes the circuit 236 of the dating device DA, resulting in the stepping of switch ES to record the date. Thereafter the circuit of traverse register TR (Fig. 3) is closed over conductor 247 and traverse of the carriage C to the extreme right ensues, and dictation may be commenced on the new sheet. This operation of shifting to a new sheet, and recording the proper data upon the head thereof, takes but a fraction of the time now required for the manual change of sheet and manual record of the heading.

Upon the completion of the dictation the subscripture key SUBS is pressed, resulting as previously set forth first in traverse of the carriage to the extreme right, and then through the energization of subscripture magnet 182 in its release to the subscripture position, at which point the subscripture may be dictated, the caps key CAPS being momentarily pressed just in advance to capitalize the first letter, and the figures key FIGS being pressed just before dictating the usual following comma. Upon the record of the comma after the pressure of the subscripture key, traverse of the carriage to the extreme right takes place, and upon the completion thereof the initialing mechanism IM is automatically set in operation, whereupon the initials of the dictating party as indicated by the set of the switches Is are recorded on the extreme left margin as usual. Upon the record of the last period, dash, or the like, following the last initial, the feed of the paper to the next sheet follows automatically by reason of the closure of circuit 261, 195 at contacts 260.

Thereupon a second letter or other writing may be immediately commenced, or else the already written letter may be severed from the individual sheet and the machine left at rest.

Obviously in this use of the machine, the operator need give practically no thought to the manipulation of the machine, but may confine his attention wholly to the distation. Only an occasional pressure of the CAPS or FIG keys is normally required, and a still less frequent use of the paragraph key PAR. It is my purpose to have these keys mounted on a disk plate, or a handle which may be operated in one hand, and to connect them by cable with the machine which may be located at some suitable fixed point beside or near the operator's desk. Then when the transmitter T' is made portable as in the form of the usual head set used in telephone exchange systems, or the usual desk telephone sets commonly used in offices, the operator may have entire freedom of movement, and in the ordinary course of dictation the free use of both hands for handling papers under consideration at the time or for making any desired notes, etc. Moreover when used by business men in offices, the room for the machine proper need not be provided on already over-crowded desks, but instead sufficient room only for the transmitter and control keys, the machine proper being mounted on a suitable portable stand as in case of the well known adding machine, and placed beside the desk, or in some corner out of the way.

On the other hand, the machine may be operated manually by the typist at any time desired thru the use of the keys of the series A, B, C, etc. or A', B', C', etc., of which former there is one for each letter of the alphabet and of the latter of which there is one for each letter of the alphabet and for each figure or punctuation character as well. In each case the typist, upon coming to the machine closes switches 270 and 271 as before as in the case of operation from the vocal analyzer to print by sound. The caps key CAPS (Fig. 3) is then pressed and the title of the party addressed is written, but in writing it the caps key need not again be pressed inasmuch as it automatically follows after each period of the superscripture. Moreover, the operator need not press the space key following any period inasmuch as spaced and capitalized first letters follow automatically after the period. Still further, it is not necessary to operate the machine to record the date, the date following automatically upon the record of the comma following the addressee's superscripture. Then pressing the paragraph key PAR carriage C is traversed to the extreme right again and then released by magnet 158 to paragraph position as in the preceding operation, whereupon writing of the address follows. The operator has only to press the caps key momentarily to capitalize any word and not to retain any finger thereon inasmuch as it is automatically released upon the record of the capitalized letter. In the body of the letter these same general functions of punctuation and capitalizing are consistently carried out. Furthermore, at the end of a line the operator has only to be careful to stop operation with the end of a syllable or word after hearing the signal, since automatic operation should record the syllabic dash when needed, and automatic traverse ensue. Upon the hearing of the opposite signal the operator recommences operation. At no time is it possible to actuate elements of the machine in such close sequence as to cause crowding of letters, misspacing or jambing of type bars inasmuch as all operation is thru the registers. When a paragraph is desired the operator has only to momentarily press the paragraph key PAR and the entire shift is automatic. At the end of the first page of dictation the proper feed to the next page is automatic, and as in the preceding case, the initials of the addressee which were registered upon the auxiliary register SR when the name of the addressee was first recorded by the operator are now recorded by operation of the secondary distributing switch $DS^2$, followed by the number of the page and the date, whereupon typing may be recommenced on the new sheet, the shift having been automatic to the commencement of the new line. Upon completion of the dictation the SUBS key is pressed and the automatic operation previously described takes place, the initialing mechanism IM being automatic. There upon the necessary feeds to the commencement of the next sheet ensue and the next letter may be commenced. Furthermore, the typist has no bother with caring for paper and carbons, in fact the keys may be placed on a neat desk or table and the actual typewriting machine in a convenient corner. After writing the mail the typist goes to the machine and takes from it the accumulated correspondence, separates it at the perforations, sorts it and presents it for signature. Multiple keyboards may be used at various points where they are most convenient, because the operator does not have to see the machine or watch its movement. A principal aim of the system is to eliminate this attention.

When used in connection with the printing telegraph or any similar system the function is similar and all the operations, except that they are electrically instead of manually controlled, are carried out in substantially the same manner. In such systems codes are very frequently used and many systems of code record or code signalling have been devised. The system of my invention will function to make a code record quite as well as to make the full record above described. In fact the code record may be made without the usual sub-division into phrases, paragraphs and sentences, the subdivisions being made upon translation of the code itself. Special utility for this system is to be found in use as a dictating machine in which the record dictated may by reason of inherent characteristics of the vocal analyzer or other functioning of the apparatus and without special provision be recorded in code form from which it may be translated by one familiar with the code. The code may indeed be constituted by the particular vocal analyzer or other control means used. Thus the spelling and punctuation, though each be far from perfect, may result in a record having the appearance of hieroglyphics, yet to one familiar with the record it may most easily be translated. An ordinary typist once familiar with it can transcribe the record as is done today from the so-called stenotype machine.

The method of my invention is obviously capable of being carried out by a wide variety of modifications, many of which may be devised by those skilled in the art without departing in any way from the spirit of my invention. I desire to cover in the annexed claims all such modifications, and in connection with the foregoing principal form of my invention I have shown several such modifications.

The first of these is found in Fig. 13. In this figure is illustrated a substitute form of the register PR. Instead of using devices comprising a single actuating magnet $rm$, and a plurality of sets of contacts $o'$ to $o^4$, successively drawn into and out of action by cams $c'$ and $c^2$, in this modification I make use of a plurality of sets of contacts $e'$ to $e^4$, each controlled by an individual relay $rm'$ $rm^2$, $rm^3$ or $rm^4$, as the case may be. There is provided a set of the relays $rm'$ to $rm^4$ for each pair of conductors 14, 15, which relays are all commonly energizable from conductor 14. That one of them which is energized upon a given energization of conductor 14 is determined by the position of switch arm 300' of distributing switch DD' which in this modification performs the functions of the distributing devices DD of Fig. 2. All of the relays $rm'$ are connected in multiple to conductor 301 controlled from contact $301^c$ of switch DD', all of relays $rm^2$ from common conductor 302 and contact $302^c$, etc. Hence that one of the relays of any set $rm'$ to $rm^4$ is energized which is connected to that one of the conductors 301 to 304 which the switch DD' has at the time connected to battery, as indicated. Assuming this to have been relay $rm'$ of the extreme left hand group, upon pulling up, this relay locks up by way of double locking contacts 305, 306, and just before making the latter contact, breaks contact 307 by which it was connected to conductor 14. Contacts 305 and 306 connect with battery respectively by way of conductors 308 and 309, the one connecting therewith through locking switch LS' of the step-by-step type and the other by bank $ds'$ of LS' to common battery conductor 310 to negative side of battery. Additionally, relay $rm'$ closes by front contact 311 the connection of conductor 15 to trunk $t'$ of the group $t'$ to $t^4$ which are individually multiplied to contacts 311 of the corresponding relays $rm'$ $rm^2$, etc., as the case may be. Still further relay $rm'$ closes by contact 312 loop 313 which connects a timing relay 314 from conductor 14 to battery, as indicated.

Over conductor 15, the actuating magnet of the represented letter is energized, and timing magnet 314 by contacts 315 closes loop 316 common to all the relay sets $rm'$ to $rm^4$ and thereby energizes relay 317. This relay pulling up by front contact 318 puts battery on conductor 319 and by way of back contact 320 of shifting relay 321, and conductor 322 upon stepping magnet 323 of distributing switch DD', whereupon this switch makes one step. The spacing of contacts 301$^c$ to 304$^c$ is made such that one step of the switch carries arm 300 one-half the space between adjacent contacts, whereby in the case illustrated, the arm 300 is stepped off the contact 301$^c$ to a point beyond contact 301$^c$ and contact 302$^c$. Relay 323 by contact 324 closes the circuit of relay 321 by way of conductor 325 and front contact 326 of relay 317, whereupon relay 321 pulls up and breaks circuit 319, 322 of magnet 323 at contact 320 whereupon a locking circuit for magnet 321 is established at the make-before-break contact 324' of the pair 324, 324', this locking circuit extending through contact 326 on relay 321.

This condition pertains until timing relay 314 is deenergized, and this relay is not deenergized until conductor 14 is deenergized. This may be a period of one moment or more, but as soon as conductor 14 is deenergized, relay 314 releases contact 315, and hence opens the circuit of relay 317 which in falling back again closes the circuit of stepping magnet 323, this time by back contact 327, conductor 328, front contact 329 of relay 321 and conductor 322. Switch DD' takes another step which this time brings it upon contact 302$^c$, and magnet 323 in pulling up in addition to stepping the switch opens locking circuit 324', 326 at contact 324', whereupon relay 321 is deenergized, and opens the circuit 328, 329 of magnet 323 at contact 329. All of these magnets are made extremely quick acting, so that but a fraction of a second is required for this entire operation, a period less than the shortest period of energization of any conductor 14. By means of this cycle of operation, it will be seen that immediately any relay of any set $rm'$ to $rm^4$ is energized, and the conductor 15 connected to the proper one of the trunks $t'$ to $t^4$, (commonly designated 309) switch DD' removes battery from the corresponding one of the common conductors 301 to 304, and immediately upon the deenergization of conductor 14, battery is placed upon the next one of the common conductors 301 to 304. The result is that no matter how rapid the dictation, not only is the energization of successive conductors 14 prevented from connecting a plurality of conductors 15 with the same one of the trunks $t'$ to $t^4$, but prolonged energization of conductor 14 does not result in connecting one conductor 15 to two trunks $t'$ to $t^4$. Moreover immediately succeeding the second energization of the same conductor 14 results not in connection with the same trunk or with two trunks of the group $t'$ to $t^4$, but each time with a different trunk, whereby double letters occurring in any given word, and especially at the division into syllables, may be recorded. In short, the cycle of operation of switch DD' by means of the timing relays 314 eliminates all possibility of confusion.

The operation of the device for all of the other relays of the sets $rm'$ to $rm^4$ is the same for each relay of each set as it is for the relay $rm'$ of the extreme left hand set illustrated as just described. If before record is made of the character designated by the energization of the relay $rm'$ of any set, the corresponding conductor 14 is deenergized and another energized, this next energization will result in the operation of relay $rm^2$ of the corresponding set, since at this time switch DD' has put battery upon common conductor 302. The same is true as respects a successive energization of relays $rm^3$ and $rm^4$ of the sets.

Now trunks $t'$ to $t^4$, as in the case of the form of Fig. 2, are connected to contacts on a distributing switch $ds''$ operated by a stepping magnet $sm''$ over conductor 21 which is connected to battery by switches $bs$ in a manner entirely similar to the connection of switch $ds$ of Fig. 1. There is this difference, however, that instead of operating release device RD by gearing connection $gs$, switch $ds''$ in this instance is connected by the shaft 330 with locking switch LS'. The switch arm 331, or the contacts thereof, are of such angular extent, that they cover the contacts 308$^c$ of all but one of the locking conductors 308 at the same time. Thus all but one of the trunks $t'$ to $t^4$ may be in use at the same time, but as the distributing switch $ds''$ puts battery onto the trunks to energize the actuating magnets $w'$ and $w^2$, the locking switch LS′ successively releases the next succeeding relay of the sets, functionally in the same manner as does the rotating cam release device RD.

It will be observed that I have shown all of the step-by-step switches in this form as in the double ended arm and semi-circular bank type, but this showing is conventional only, as any other type of step-by-step switch may be used as well.

On the right hand of Fig. 13 is indicated by a single set $rm'$ to $rm^4$, a similar register device PR² which is intended to take the registration of all traversing movements of the carriage C and all feeding movements. Normally this register PR² is not operated, but is whenever a traversing or feeding movement of carriage C is initiated, and relay 62′ of Fig. 13 is pulled up over conductor 64. It can be traced through Fig. 1, etc., to the various traversing element controls as aforesaid. Only upon the completion of the traversing movement set up is the locking circuit 94 broken as hereinbefore fully set forth. By this means whenever 62′ is energized battery is removed from arm 300′ of DD″ of register PR² whereby further registrations on PR′ are precluded just as in the form of Fig. 3. DD′ has connected with it however a synchronously stepped switch DD″ controlling the secondary register PR² exclusively. This continues in operation carrying out the sequential registration of the traversing movements as before. The moment the traversing movements cease 94 is broken, 62′ is deenergized, and the switch DD′ and the primary registers PR′ are restored to normal operation. $ds''$ and LS′ operate the trunks $t'$ to $t^4$ of PR′ and PR² jointly. It will be noted that 62 and 62′ take care of "end of line" traverse movements. The interline movements are cared for by a lockout in connection with the control keys hereinafter to be described.

It is entirely feasible to construct a typewriting machine for an extremely high speed of operation, though the attainment of this speed may be at the expense of durability. With such machines, however, the registers PR will not be needed, since the machine will record the characters as fast as they are pronounced. The modification of Fig. 14 is devised particularly for use in connection with such a machine. As in case of Fig. 13, the apparatus here shown is intended to take the place of that shown in Fig. 3. The circuits 14, instead of operating primary register magnets $Rm$, connect directly in most cases and indirectly through normally closed contacts in other cases, with conductors 15 whereby actuating magnets $w'$ are actuated directly by relays $Re$, or it may be directly from coherers $co$ or the equivalent. Those conductors 14 which do not connect directly with conductors 15, connect through shifting contacts 335 commonly operable by relay 336 to shift the connection from one conductor 15 to another. This is to provide for alternative spelling, or in other words, for the proper spelling of those words which have the same pronunciation. For instance the word "read" which may also be spelled "reed." The conductor 14 energized in response to the "e" sound or the second of two successively responsive to the "ee" sound, in order to effect the record of the word "read," must be connected to the conductor 15 controlling the circuit of the actuating magnet $w'$ of the letter "a." Thus in the normal operation, the word recorded would be "reed," but when it is desired to record the word "read," the key SPEL is pressed, energizing relay 336, and resulting in the shifting of all the contacts 335 and the connection of the proper conductor 14 to the proper conductor 15 to record "a" instead of "e" in the third place. Obviously many modifications of this idea may be used, the shift contacts 335 being divided into groups, each controllable by a separate relay 336 from a separate key SPEL, if the rules of spelling adopted make it advisable.

To record figure characters from dictation in the absence of the register devices PR, a set of locking relays 337 is provided, these relays being each energized from conductor 14 with which it is associated and by common conductor 338 to battery through the figures key FIGS, which is closed and held closed when it is desired to record figure characters. Each relay when it pulls up closes a locking circuit for itself by contacts 339 to common locking conductor 340 normally closed to battery through contacts $bs'$ in series, the contacts $bs'$ being each pair individual to a type bar B of the machine and actuated by cores $c$ of actuating magnets $w'$, $w^2$ in the same manner as are the switches $bs$. The pulling up of a series of 337 closes by contacts 341 of the relays in series one or another of the circuits 101 of the figure character actuating magnets $w^2$. That one closed, depends upon the particular combination of relays 337 which is pulled up. Thus for instance, to represent the period character, those relays 337 connected respectively with conductors 15 connected with the actuating elements of the characters p, e and r may be the ones chosen, and when the last one of the three pulls up, the circuit 101 of the period magnet is closed. These circuits are not claimed in detail, since many combinations may be used, but a number of them are shown in detail. Promptly upon the record of the figure character so determined, contacts $bs'$ are opened as the corresponding magnet $w^2$ is energized, and the relays 337 are unlocked and fall back. In dictating successive figure characters, such for instance as numerals, the operator should wait until he hears the character struck before dictating the next succeeding, so that the relays combining to determine the record of the next character may not be unlocked prematurely. Preferably contacts $bs'$ are opened, unlocking relays approximately at the extreme upper end of the stroke of the type bar. Figs. key controls also the same lockout circuits as before (not now shown).

Not only may the peculiar form of the register devices made use of be varied, but the form of the "vocal analyzer", or other speech operated controller may also be widely varied. In Fig. 6 I have shown a modification of this in which instead of utilizing tuned circuits, I make use of a diaphragm $Di$ upon which the sounds are directed. This diaphragm is pivoted at its center 342 instead of being supported at its outer edge, and in operation vibrates on various diameters forming the well known chords of Chladni. The outer edge of the disk is provided with radial slits or slots 343 forming a plurality of more or less rigid spring fingers 344 which are thrown into forced vibration of greater extent than the vibration of the main body of the disk. Each of these fingers in vibration is arranged to close a particular circuit $sc$ of a relay $Re$. The pronounced sounds are thus in effect split up into their various components and each component effects the energization of a particular relay $Re$. In constructing an analyzer of this type, there is necessary of course adjustment of the contacts 345 each to the proper finger 344, and the adjustment of the spring and mass of fingers 344 to obtain proper differentiation. This can be readily determined by experiment, a particular finger or a particular plurality of fingers being set in highest vibration by a particular sound only. The fingers 344 may be tuned if desired, as in case of the Frahm frequency indicator, being for this purpose made of not only more or less mass, but being made of greater or less length and tension.

In Figs. 9 to 12 I show several apparatuses for making use of this diaphragm analyzer $Di$. In the first of these, shown in Fig. 9, the diaphragm $Di$ is supported rigidly at the front end of a screw 346 mounted adjustably in arm 347 of bracket 348 carried on pedestal 349. Also carried on the bracket 348 in a plane parallel to that of diaphragm $Di$ is a contact ring 350 of insulating material through which project adjustable contacts 345 in close proximity to the back face of the diaphragm. Housing the diaphragm closely but not touching the same and extending in front thereof is a housing 352 into the center of which is let a mouth-piece 353 of the usual type found in telephone transmitters. Upon speaking into the mouth-piece, the air in the interior of the housing 352 is set into vibration and the diaphragm vibrated correspondingly, with the result that the contacts 345 are closed in succession, singly or in combinations.

Another form of this device is shown in Fig. 12. Similar parts bear similar reference numerals. The diaphragm in this form is hollow in the center, being formed of two disks sealed together at their outer edges adjacent the inner ends of fingers 344 after the fashion of a well known aneroid barometer. It is supported on the outer end of a rigid tube 354 which communicates with the interior. The interior contains a fluid, compressible or noncompressible, the pressure of which—and hence the tension of the diaphragm—may be regulated by turning piston screw 355 threaded into the outer end of the tube 354. Tube 354 is supported directly in arm 347, being splined therein by key 356. It is adjustable by means of screw 357 in bracket 347 bearing against collar 358 and adapted to force collar 358 and tube 354 forward against the pressure of spiral spring 359 intermediate the collar 358 and the insulating ring 350. By this adjustment, as with the adjustment of screw 346, the diaphragm may be adjusted minutely with respect to contacts 345. This adjustment of the diaphragm as a whole, when employed with the adjustment of the individual contacts 345, makes possible adjustment to meet any existing relative vibrational conditions as respects the various portions of the circumference of the disc.

In Fig. 10 is shown still another form, in which instead of using the diaphragm, a parabolic bell 360 of thin steel or other material having the proper vibrational qualities is made use of. The bell is adjustably supported from arm 347 as in case of the diaphragm, and its outer edge is slit or slotted to form fingers 344 lying approximately parallel with the axis of the bell. Contacts 345 are supported by ring 361 in a plane transversely of the axis of the bell, and housing 352 is supported directly from ring 361. The vibration in this form of analyzer is highly intensified, owing to the parabolic shape of the vibrating element, the vibration taking place on diameters perpendicular to the axis of the bell. If desired, the mouthpiece 353 may be extended inwardly, as shown in dotted lines, to a position approximately at the focus of the paraboloidal surfaces of the bell.

Figure 17:
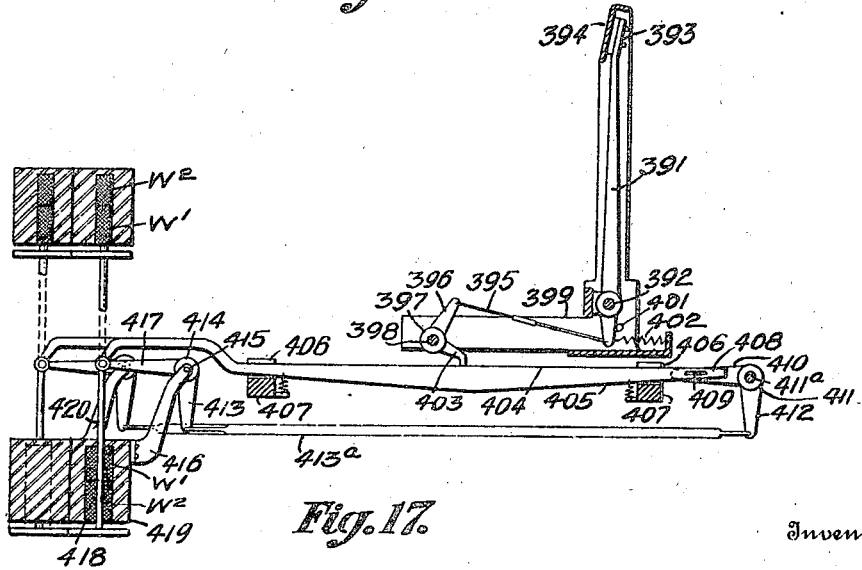
Fig. 17 is a schematic view of the details of the type bar operating mechanism; if it were a true section it would be taken on line 17 17 of Fig. 15 looking in the direction of the arrows.

It has been heretofore mentioned that in the embodiment of this system in a typewriting machine, it was intended to feed the paper from a roll. In order to do this satisfactorily, and economize space, it is highly desirable that the type basket move instead of the platen. In Figs. 15, 16 and 17 are shown the means by which this is carried out. 370 is the main frame of the machine. The platen 371 is supported in longitudinally fixed position in eccentric bearings 372. By the simultaneous movement of bearings 372 at both ends of the platen, or by other equivalent arrangement such as is commonly known in the old Remington typewriters, the platen may be shifted up and down for capitalizing. The same upright 373 which supports the platen is extended to the rear and connects with upright 374 to form a framework for supporting the paper rolls. Preferably all of the paper rolls are supported from arms which project rearwardly from the hindmost upright 374 whereby the rolls may be removed and renewed readily. The roll 375 bearing the original sheets is supported from bracket 376 and feeds underneath the platen 371 and over table 377 and top roller 378 to basket 379 which catches the original copy. The roll 380 for the copy also feeds under the platen, but after passing from the platen it passes to reel 381 supported from bracket 382, upon which reel it may be wound by hand or by mechanism driven from the platen 371. Between the original and the second sheet rolls 375 and 380 passes a belt 384 of carbon paper or other duplicating material, this belt passing over the platen between the original and second sheets, and over idler pulleys 385 and 386 in such position that it clears the rolls 380 and 381 of the second sheets.

In front of the uprights 373 and somewhat below the platen 371 is supported the longitudinally movable frame 387 of the type basket 388. As clearly shown in Fig. 15, this frame is supported on ball bearings 389 in laterally extending race-ways 390. Any other equivalent means of support may be used. This basket is formed by individual type bars 391 pivoted commonly upon a segment 392 in a plane approximately transversely of the machine, and having their heads 393 (see Fig. 17) in an arc-shaped rest 394. Their inner ends are connected by links 395 with the outer ends 396 of bell cranks 397 commonly mounted on transverse axis 398 extending between the two branches 399 and 400 of the frame 397. The type bars are normally biased against stops 401 by springs 402 or else held against rests 394 thereby. The ends 403 of bell cranks 397 lie closely adjacent to the front edges 404 of a series of transversely extending edgewise arranged parallel actuating bars 405.

There are two sets of these actuating bars, one on each side of the center of the machine, as clearly shown in Fig. 15, each set carried in slots 406 in combs 407. Both the inner and the outer end of each bar 405 are supported from bell cranks. The inner end 408 is connected by pin and slot connection 409 with the substanially parallel arm 410 of bell crank 411. The right angular arm 412 of bell crank 411 is connected by rod 413$^a$ with the similar arm 413 of bell crank 414 pivoted upon vertically extending axis of pintle 415 supported by bracket 416. Arm 417 of crank 415 connects with the corresponding end of bar 405, and is substantially parallel with the body of the bar. Electromagnet $w'$, $w^2$ is enclosed in an aperture 418 in vertically extending iron block 419, and through rod 420 connecting with arm 417, actuates bar 405. It will be observed that owing to the substantially parallel relation of arms 417 and 408 and bar 405, and the connection 413, the movement of bar 404 upon actuation by magnet $w'$ $w^2$ is a parallel, bodily, lateral, movement substantially free from endwise displacement and of the same extent from end to end of the bar. Thus no matter where the type basket 388 may be in its various positions, the arm 403 of any type bar 391 is always directly over its actuating bar 405 and in position to receive the proper actuating impulse therefrom.

The actuating magnets $w'$ $w^2$ are arranged in banks in blocks 419, and the blocks arranged in pairs as indicated, and as shown in Fig. 15, the centers 421 of the actuating magnets of adjacent banks are staggered with relation to each other, whereby magnets of substantial size may be used. As shown the banks of the front set are approximately one-half diameter apart. Those of the rear bank will be disposed quarter diameter as respects those of the front set. Since there are provided banks both right and left as well as front and rear, by the proper staggering of the connections to the bars B, there will be ample room for iron-clad electro-magnets of very substantial proportions.

It will be noted that the ends of bars 405 connected with the actuating magnets $w'$ $w^2$, are slightly off-set. This is done to accommodate the axis 415 of the bell cranks 414, whereby the approximately parallelism of the arms 417 may be preserved.

For actuating the shiftable type basket 388, the usual actuating elements provided in connection with shiftable platens may be provided. Many such are well known and it is therefore not needful that they be set forth here. It is preferable that they be arranged on the under side of the basket frame 387 in any suitable manner, being appropriately connected with the main frame 370. I show, however, the spacing rack 422 connected with frame 387. Furthermore I show a tabulating bar 423 mounted on the front of the main frame 370 in suitable bearings and carrying adjustable stops 424 arranged to be variously engaged by fixed stop 425 on the front of the shifting frame 387. This tabulating bar and its controllers may be in all respects similar to those now employed in connection with shifting platens, the essential element being that the shifting frame 387 takes the place of the shifting platen as the movable part. It will be noted that the bar 405 is the equivalent of bar B of Fig. 1, and that the magnet 182 is for the purpose of operating the subscripture shift, the tabulating bar or rack serving the same purpose as the shaft 152 of Fig. 6.

Still another modification is shown in Figs. 18 and 19. It is characterized principally with the omission of the registering units and operation of the type bar actuating magnets directly from and in synchronism with the actuation of the character relays Re. Parts similar to those used hereinbefore are provided with like numerals throughout, but the new parts have different numbers.

Re are the analyzer relays controlled from the vocal analyzer Di. Tf is a set of transfer relays intermediate the relays Re and the actuating magnets $w'$. Relays Re are of the slow relay type, i. e., quick to pull up and slow to retract, while relays Tf are of the fast relay type. Each relay Re makes two contacts, a front contact 426 controlling circuit 427 of corresponding relay Tf and a back contact 426$^a$ controlling through front contact 429 of relay Tf the circuit 430 of actuating magnet $w'$. Certain relays Re make an additional back contact 428.

In addition to contacts 429 relays Tf are provided with ordinary locking contacts 431 controlling their locking circuits 432 through normally closed limit contacts 433 of magnets $w'$ of the type bars. The relays Tf are further provided with parallel locking contacts 434 connecting with extraordinary locking circuits 435 to figure or carriage actuating magnets, and with series circuit closing contacts 436 controlling in series the circuits 437 of the figure or carriage actuating magnets, all as will appear more fully later on. As will be seen later also, some relays Tf may have a plural number of contacts 434 and 436.

SM is a slow relay testing group entirely similar to that used in the preceding forms of the invention, and its magnets 31, 37, 40, 53 have the same functions as heretofore. So too have the relays 62, 69$^a$ and 80 of the transfer group governed thereby.

The carriage controlling devices Sd, Tm, Cs, Lf, Pf, etc., also have the same functions as in preceding forms. In connection with certain of them however, are provided control relays hereinafter to be described. Certain additional auxiliary relays are also used in connection with the period, space and capital shifts, and also in connection with the figure shifts.

The interrelations of the various instrumentalities will now be understood from the description of the interconnecting circuits.

The relays Re are energized directly from the analyzer Di, which in itself may be of any recent known or future known form. It suffices that each relay Re is controlled from and by that portion of the analyzer responding to the characteristic vibrations of the sound of the letter imprinted by that actuating magnet $w'$ ultimately energized through the particular relay Re. The circuits of all the relays Re are similar, extending from analyzer Di connected with battery P. B. through the relays and thence to negative battery over common conductor 438, Figs. 2 and 1, and relay 31 of set S. M. Thus relay 31 is energized each time as is relay Re, and through relay 37 constantly measures the syllabic and word intervals, with resultant appropriate energizations of space magnet Sd, dash maget DASH, and traverse motor Tm, as will appear.

Each time a relay Re pulls up, it closes and holds closed during the persistence of the characteristic vibration, the circuit PB, 426, 427, Tf, NB of a transfer relay Tf. Tf locks itself up over ordinary locking circuits 431, 432, 433 to PB. 433 is a limit actuated locking contact on corresponding actuating magnet $w'$, actuated only at or near the limit of movement of the plungers or cores $c$. Thus Tf remains energized until the energy gathered by the type bar is sufficient to insure proper imprint. But $w'$ is not actuated until relay Re falls back, when it closes circuit 426$^a$, 429, 430, $w'$ from PB to NB by way of common conductor 439 (Figs. 2 and 1) including series relay 471 and normally closed contacts of the FIGS. shift key (Fig. 2). Thus $w'$ throws the type bar to the platen to imprint the letter. At a point suitably near the limit of its movement its core $c$ strikes the limit contacts 433 and opens the locking circuit of relay Tf, and in turn its own circuit at 429. Thus is the action made wholly positive with no chance of failure. Because Re closed circuit 430 by its back contact 426$^a$ there is no chance of doubling letters on sustained letter sounds which keep Re pulled up. Only when double letters bound syllabic intervals with letters be doubled as is proper, and in such cases relays Re will pull up two separate times, once at the end of a preceding syllable and once at the beginning of a succeeding syllable. This is the operation for each letter actuating magnet $w'$.

The spacing mechanism SM when space intervals occur between word sounds, closes through back contact 70 of relay 69ª the circuit 440 of spacing magnet S*d* which upon operating breaks at a suitable point in its operation the locking circuit 441 of relay 40 at locking contacts 442, making relay 40 ready for a succeeding operation. When the end of the line is reached both relays 53 and 69ª are energized through the closure of *lm'* over conductor 58 and the relay T*r* of the traversing motor is substituted for S*d* through closure of front contact 70 of 69ª. The occurrence of a space interval effects closure of circuit 69, 70, 443, T*r*, and traverse of the carriage ensues instead of space movement. Locking circuit of relay 40 is broken at the end of the traverse movement at contacts 444 on *lm*. If however, under these conditions a syllabic interval occurs instead of a space interval, the circuit 65 of dash actuating magnet DASH is closed through contacts of relay 53. Actuation of the dash magnet opens locking circuit of 40 at limit contacts 445, closes circuit of relay 80 at contacts 446, and upon deenergization closes at 447 the circuit 448, 443 by way of front contacts 449 of relay 80. Inasmuch as relay 80 has locked up by its contacts 450 and circuit 94 to limit contacts 95 of switch *lm*, circuit 448, 443 is closed at 449 and relay T*r* is energized as before, traversing the carriage after the dash registration, whereupon relay 80 is unlocked at contacts 95 along with relay 62. At the initiation of these movements bell 62 is sounded as in the forms of Figs. 1–6, etc.

To record figure characters the figures key FIGS is pressed. This breaks the connection of common conductor 439 of the actuating magnets *w'* and the locking contacts 433 with battery at contacts 451 and 452 respectively, and thereafter makes the connection of actuating magnets *w'* of the figure characters and their associated locking contacts 445ª at contacts 453 and 454 respectively. Thus letter character magnets *w'* and the normal locking circuits of relays T*f* are disabled, while figure character magnets *w*² and abnormal locking circuits of relays T*f* are enabled, for contacts 445ª complete locking circuits 435 to which relays T*f* individually lock in parallel by contacts 434. Thus if the word "period" be pronounced in the analyzer D*i*, and if the first three letters are the key letters, relays T*f* of characters P, E, and R pull up in succession and upon the pulling up of the last, that associated with the letter R, back contact 428 of that relay closes by conductor 455 and the series contacts 436 of relays T*f* pulled up, the circuit 456 of the actuating magnet *w*² of the period actuator PER. The circuit is broken at limit contacts 445ª when core *c* of this actuator approaches the limit of its movement, simultaneously unlocking the relays T*f* of the group P, E, R. Obviously any other letter groups or any single letter of the word may be chosen as the combination or key to the figure character and the actuating and locking circuits combined similarly. The criterion is that the letter combinations chosen as the keys to figure characters shall differ from each other. A combination of four letter groups T, R, A, and V to control the energization of the traverse motor is also illustrated. Its circuits may be easily followed, being numbered similarly to those of the set P, E, R.

Upon the record of a period, space and capital carriage movements automatically follow as in the case of the previous form of the invention and in the following manner. Upon actuation of magnet *w*² of PER contacts 456, 457 are closed, energizing relays 458 and 459 respectively, which relays lock up through contacts 460 and 461 respectively, the one over circuit 463 of magnets of S*d*, and the other over circuit 464 and contacts of make before break pair 466, 465 of C*s*. S*d* and C*s* are simultaneously actuated with resulting space and capital shift movements whereupon relays 458 and 459 are unlocked. S*d* promptly falls back, but C*s* remains locked up over circuit 467, closed by its locking contacts 466 before 465 are broken and including contacts 468 of make before break pair 468, 469 of relay 470. A relay 471 in series with common battery conductor 439 of the actuating magnets *w'* controls by its contacts 472 the actuating circuit 473 of magnet 470. Magnet 470 locks itself up by its contacts 474 and circuit 475 through contacts 476 of caps magnet C*s*. Simultaneously it transfers locking circuit 467 of caps magnet C*s* by way of make contact 469 and conductor 477 to control of relay 471 at contact 478. Thus the moment the first character is recorded and the current impulse in conductor 439 correspondingly has died, C*s* is unlocked at contacts 478 and the carriage drops to normal position for the second letter. Thus the first letter only of the word following a period has been capitalized and subsequent letters are of ordinary type. Contact 476 of C*s* in falling back unlocks relay 470 restoring it to normal status. The actuation of the comma magnet COM will automatically effect actuation of the space magnet S*d*, by closing at 479 the circuit of relay 458 in parallel with contacts 456. Thus space also automatically follows comma.

It is believed that other operations will be fully understood from the circuits outlined especially in conjunction with the full description of the enlarged system herein before given. Obviously primary and secondary registers may be interposed in these circuits as well, being interpolated in conductors 430 analogous to conductors 14, and contacts 433 operated by the register relays instead of *w'*. Or on the other hand the system of relays Re—Tf of Fig. 19 may be bodily substituted for the system of relays Re of Figs. 4 and 5, thus gaining the advantage of the slow relay operation and eliminating the elaborate system of tuned circuits of Figs. 4 and 5. Obviously also there may be provided in connection with this modification of Figs. 18 and 19 all the manually operable supplemental control keys. Devices Lf and Pf may be controlled by hand or in the manner of the device Tm. The outstanding features of this modification remain however the circuits between the analyzer and the actuator magnets $w'$ whereby the register may be omitted and positive operation assured. It is only necessary to have the typewriter mechanism light and fast enough in operation to insure record synchronously with the actuation of relays Re and Tf.

In conclusion a number of items need supplementary mention. First, the relay 31 of the modified analyzer circuits of Fig. 5 instead of being in a special tuned circuit as in Fig. 4 is in series with the common battery lead NB of the relays Re. The syllabic groups of current impulses in this common battery lead are separated by periods of time proportional to syllabic and space intervals. It is believed best that the relay 31 be made a trifle slow in operation so that intervals less than syllabic intervals between current impulses may not result in its falling back prematurely. The natural characteristics of the relay may be found entirely sufficient for this purpose. The same is true of the relay 31 of Fig. 18.

The resonant circuits sc may be of any known form, or form to be known. At the present time there are known to the art many forms of these circuits for effecting operation of relays. Sometimes these circuits are called tuned selective circuits. Many of them are to be found in the art of wireless telegraphy and still others have been originated and published for use in connection with vocal typewriters or voice analyzing machines. Instead of the coherers co of the granular type, detectors of the mineral or other type may be employed in lieu thereof. The coherers co if of the form illustrated may be decohered in the usual manner by having any form of tapper actuated from a magnet in the train energized through the coherer such for instance as corresponding magnet rm of device D. The criterion is that decoherence should not take place until that device whose actuation is sought is actuated, or else some device having control thereover is actuated. Tuning involves merely mechanical and electrical skill.

In Fig. 3 both figures shift FIGS and caps shift CAPS have been shown and in Figs. 3, 6 and 1 their connections through a system of circuits to figures and caps actuating magnets Fs and Cs respectively. Obviously one or the other of these shifts may be omitted, depending upon the character of the typewriting machine which is used. Most of the modern machines are provided with caps shift only. This suggested omission applies of course to carriage shifting movements only. In order to secure the imprint of dictated figure characters, a key the equivalent of the FIGS key of Fig. 3 and having the same functional control needs be used. Specifically then let us assume that Cs and Fs of Fig. 1 impart to the carriage the same shifting movement and that the principal function of Fs is to operate the various contacts 102, 103. From this it is obvious that Cs and Fs can be combined.

There are two additional features shown in Fig. 3 which also need special mention. The first is the control key lock out for use in case a vocal operating attachment is used. Arranged intermediate the negative battery bar 480 and the control keys is a lock out bar 481 containing circular openings 482 through which the control keys may be pressed to contact with bar 480 when bar 482 is held in its normal position by biasing spring 483. The opposite end of the bar 481 however is acted on by magnet 484 in series with the common conductor NB of the relays Re of the analyzer circuits of Fig. 4. Thus whenever dictation is in progress lock out bar 481 is drawn to the left in which position openings 482 are moved out of registry with the control keys and control movements of the typewriting machine are precluded until dictation has ceased. This prevents premature registration or irregular registration of control movements.

At the upper left of Fig. 3 are shown diagrammatically two small switches X and Y through which positive battery PB is supplied to the relays of the set 186, 116, 117, 125. Switch X and switch Y are driven by shaft us of the primary register PR. The wipers of the switches are so arranged with respect to their contacts that the one X puts battery on its bus in synchronism with the operation of contacts $o'$ to $o^4$ but does not energize its bus 125" between shifts of contacts $o'$ to $o^4$, while the other switch Y has its wiper at 45° to the wiper of switch X and therefore puts battery on its bus 125' only when shaft us is operated to shift from one contact $o'$ to another $o^2$ etc., that is while PR is shifted from one trunk of the group $t'$—$t^4$ to another. Thus are premature and irregular operations of the relays of the control group mentioned precluded and forced to take place in the successive order as respects register devices D as determined by the register itself. Any relays the operation of which it is desired to relate to the primary or secondary registers PR and SR may be similarly controlled.

It is apparent that parallel bars 405 of the machine shown in Figs. 15–17 are none other than the bars B of Fig. 1.

In Figs. 20–23 are shown in enlarged diagrammatic form the switches DS² and PS of Fig. 2 and the switches ES and ES' of Fig. 6. Owing to the limitations of space on the major sheets, the switches are there incompletely diagramed but in Figs. 20–23 these diagrams are complete. The operations of step by step switches as they are actuated from one contact to another of their series and finally come to rest at the end of a given group of the series are so well understood that no special mention of it need be made here. Multipled groups of contacts are also well understood in their relation to one direction switches. Switch PS however is not a one direction switch but a switch restored to a determined normal by spiral spring 222. Its normal position is defined by stop 210ª. In this position and in this position only it holds contacts $kg$ closed. Switch ES' in Fig. 21 shows very clearly indeed the relations of contacts 174 and 260 to switch arm 175. The switch arm 175 is of the single ended type but it carries above it a double ended insulating bar 175ª which actuates contacts 174, 260 once each half revolution. It is the projecting end of the upper contact 174 which is struck by the passing end of the bar 175ª and carried upwardly to break with mating contact 174 and to make contacts 260. Upper contact 174 then ratchets past the end of bar 175ª just as the latter moves to its resting place.

In connection with switch ES is shown a new system of circuits whereby the subscription magnet is energized in advance of the dating magnet whereby the subscripture shift is brought about before the dating operation takes place. Conductor 236 energized from switch DS² instead of extending directly to magnet 237 as in Fig. 3 extends directly to the subscripture magnet 182 through the normally closed contacts 165' of the set on the shaft 152 carried just in advance of the abutment 161, and arranged to be actuated by the end of shaft $s$ when the subscripture movement is brought to a finish by the stop 161. Thus this magnet 182 is energized, the movement takes place, the magnet meantime locking up through contacts 182ᵇ and the second pair 165 of the set on the shaft 152. A third pair 165'' is however added to the other two pairs of the set, and when shaft $s$ strike not only are 165 and 165' opened unlocking 182, but 165'' is made closing the circuit of the magnet 237 which is to step the switch through its cycle. This closure effects the first step, and as is fully described hereinbefore its stepping is continued by the operation of the interrupter I$n$. The other circuits associated with the magnet 237 and the magnet 182 are the same as in the preceding forms.

The remaining features of these switches are so readily understood from the diagrams as not to need description.

Thus is characterized the system of my invention. As in case of most apparatus of this sort it is of a more or less complicated form in certain parts. It should be understood that in such circuits as usual there are likely to be certain inaccuracies or errors of connection, in general of a character likely to be made by an electrician or mechanic in setting up such circuits from a diagram, and which the electrician or mechanic through his skill knows how to correct the moment the error manifests itself through improper operation or test. The skilled engineer will be even more quickly able to remove such inaccuracies. I have described with great care the interrelation of the parts and the sequence of their operation which are necessary to bring about the desired useful results. Clearly if parts having the adjustments disclosed for any reason upset the interrelation or the sequence of operations described, it is within the province of a person skilled in the art without the exercise of invention to change those adjustments to such a degree as will ensure the interrelation and sequence clearly set forth. The means of adjustment known to this art and its kindred arts are very many. Among them may be mentioned fast and slow relays, timing relays, point contacts, wiping contacts, make before break contacts, high and low resistances, etc. Any of these adjustments or their equivalents which are found in the art of telephony and telegraphy I reserve the right of using in case needed to perfect the interrelation and sequence set forth in any case. Timing or sequence of operation is important but once it has been set forth its attainment in the present highly developed state of the arts is merely a matter of mechanical skill. Nor does increase or decrease of the margin of operative sequence involve invention.

A number of portions of the system should have special mention in this general connection. First, the analyzer D$i$ instead of being of the form invented by me may be of any of the forms now known or to be known to the art. Thus either the Ferguson or Flowers types of vocal analyzers may be substituted, provided they are sufficiently efficient for practical use. Ferguson has used a diaphragm analyzer while Flowers has used tuned reeds and tuned circuits. There are still others. I reserve the right to apply by extension the circuits herein disclosed to any form of typewriter known to the art. Some of them have one form of key board and one form of key shift and some others. The shifting and traversing movements are various. I have already indicated the interchangeability of shifting carriage and banks of type bars, illustrating one in connection with the diagrammatic showing of my invention and the other in connection with the machine feedng rolls of paper. It is apparent also that the figures shift key FIGS or its equivalent may be used for paragraph, transverse, and the like shifts which may then be dictated to the machine. This means that there would be but one key under the control of the operator and that would be the FIGS key. All other controls would be dictated to the machine while the FIGS key was pressed. The FIGS key always means a word combination, but may not always mean a platen shift. The word dictated determines this through the combination circuits 101 and it varies with the variation of the keyboard. All numerals on the universal keyboard are printed without a platen shift, but on some other machines a platen shift accompanies such printing and is incident to it. However it is believed that with the advent of commercial systems of this class the typewriting machine will be built especially for the work and not adapted to it.

I conceive that there may be use for the register circuits of my invention in connection with the typewriting machines used in the art of printing telegraphy.

Finally I desire to have it understood that each of the several branches of the system of my invention as respects operativeness stands on its own foundation. Thus the analyzer itself or the analyzer circuits of Figs. 4 and 5 are capable of performing the functions assigned to them independently of the rest of the system. They may be used with other systems of circuits than those disclosed in Figs. 1, 2, 3, and 6. As analyzer circuits they stand or fall on their merits as such. So also do the circuits of the primary and secondary registers PR and SR of Figs. 2 and 3, so also individually do the dating and initialing circuits of Fig. 6 and so on. Therefore possible inoperativeness of any of these specially functioning branches of the system has naught to do with the operativeness of any other, and not necessarily with the operativeness of the system at large. Thus the dating and initialing mechanisms could be eliminated entirely without affecting the remainder of the system. Thus also the registers could be eliminated and relays Re operated directly upon the actuating magnets $w'$ and $w^2$. The interrelations of the branches through cooperating interconnections however stand on a somewhat different footing. It is by means of them that the branches are knit together and are appropriately interrelated to form the comprehensive whole.

It goes without saying that all modifications of my invention not falling without its generic spirit are comprehended in the annexed claims.

The stop contacts carried by shaft 152 are of course given any suitable insulated mounting thereon, and flexible connections to their circuits not interfering with the movement of shaft 152.

Instead of control through switches X and Y of Fig. 3, similar control may be exercised through relays of the order of relay 80. Also inasmuch as there are in the system disclosed in Figs. 1–6 no punctuation mark registers other than the dash register DASH, it is clear that the interlocking circuits for these other punctuation or figure characters may be controlled from contacts actuated from magnets $w^2$ or relays in the nature of relays 109 and 140 in circuits 101.

Brushes $b$ and $b'$ are of course carried by the platen frame, and in the machine diagrammed in Fig. 1 having a shifting platen connection must be made with them by suitable flexible or trolley, connections as is well understood in the art. Similar means must be employed to take the current into the segment $t$ with which the brushes $b$, $b'$ make contact.

In Fig. 3 there is shown a syllable key SYL the function of which is to effect manually the registration of the dash for syllablizing over circuits 67 connecting with 65.

In addition to operation of figures and caps shift magnets $Fs$ and $Cs$ by conductors 245 and 257 when devices ES and ES' are in action, special segments $245^a$ are provided on each of these devices through which battery is placed on branch conductor $245^c$ for the energization of relay $245^b$ (Fig. 1), the function of which is to open at its contacts the loop 21 controlling the actuation of switch $ds$ and thereby prevent false stepping of this switch. False stepping of this switch occasioned through any actuation of magnets $w'$ and $w^2$ except that through the primary register PR would bring about an abnormal relation of switch $ds$ to trunks $t'$ to $t^4$ and switch DD, and the relation would only be restored to normal through the complete loss of several registrations or their record in the wrong order. Switch $DS^2$ is also shown in Fig. 22 to be provided with contacts $245^d$ arranged to be connected with $245^c$.

In Fig. 18 is shown a loop $y'$ which is opened when magnet 62 is energized. This loop is intended to be an illustration of a loop in series with the common battery connections of relays Re or $Tf$ which may be controlled if desired by relay 62 after the fashion and for the purpose of a similar control exercised by relay 62 of Fig. 2 over the common battery connection of the relays $rm$ of the register PR at contact 92.

I would mention also that I reserve the right to operate any primary actuating element through appropriate relay control, to use split contacts where necessary, and to use one direction contacts or its relay equivalent such as relay 40 in group SM, as well known in the art, wherever they may be found necessary to complete a purpose or sequence of operation otherwise clearly described.

Obviously all control actions or interoperation coordinate with those described may be carried out by means similar to those described. For instance all characters the imprint of which is surrounded or imposed with the same conditions, or similarly interrelated to other characters and operations, may be secured through a similar train of operations carried out by a similar train of devices. It has therefore been unnecessary to illustrate all operations or all movements as applying to all characters. Nor has it been necessary to illustrate the trains of devices applying to all of the movements and operations which will appertain to the commercial machine.

I claim:

1. In a system of control for printing machines an electromagnetic register connected therewith to receive registrations in a serial and time order determined by the operator, electromagnetically actuated recording means operated through the register and switching means individually operated by the units of the recording means and controlling the register.

2. In a system of control for printing machines, a register connected therewith to receive registrations in serial and time order determined by the operator, and recording means operated through the register, but itself controlling the register.

3. In a system of control for printing machines, mechanism printing characters in lines, operating means for the character printing elements thereof capable of operation in time groups corresponding to syllables and separated by time intervals, a testing device operative at the marginal ends of the lines and controlled through said time intervals, and a syllabic character recording element controlled by said testing device.

4. In a system of control for printing machines, mechanism printing characters in lines, operating means for the character printing elements thereof capable of operation in time groups corresponding to syllables and separated by time intervals, a testing device operative at the marginal ends of the lines and controlled through said time intervals, and a line traversing device controlled by said testing device.

5. In a system of control for printing machines, mechanism printing characters in lines, operating means for the character printing elements thereof capable of operation in time groups corresponding to syllables and separated by time intervals, a slow relay operative at the marginal ends of the lines and controlled through said time intervals, and a line traversing device controlled by said slow relay.

6. In a system of control for printing machines, mechanism printing characters in lines, operating means for the character printing elements thereof capable of operation in time groups corresponding to words and separated by time intervals, a testing device operative at the marginal ends of the lines and controlled through said time intervals, and a line traversing device controlled by said testing device.

7. In a system of control for printing machines, mechanism printing characters in lines, operating means for the character printing elements thereof capable of operation in time groups corresponding to syllables and separated by time intervals, a testing device operative at the marginal ends of the lines and controlled through said time intervals, a punctuation character printing element, a spacing device energized through actuation of said punctuation element and also controlling said testing device, and a line traversing device controlled by said testing device.

8. In a system of control for printing machines, means recording characters in lines, operating means for the character recording elements thereof capable of operation in time groups corresponding to syllables and words by which word groups are separated by time intervals of different lengths from the syllable groups of the same word, a timing device connected to gauge said intervals, a syllable recording element actuated at line ends from said timing device when the time intervals gauged are of one length, and a traversing mechanism actuated at line ends when the time intervals gauged are of another length and also controlled at line ends through actuation of said syllable recording element.

9. In a system of control for printing machines, means recording characters in lines, operating means for the character recording elements thereof capable of operation in time groups corresponding to words and separated by time intervals corresponding to intervals between words, a timing device connected with said operating means, a spacing mechanism normally actuated in said intervals by said timing device and a line traversing mechanism substituted for said spacing mechanism at line ends, to be actuated through said timing device.

10. In a system of control for printing machines, means arranged to record both small and capital letters and figure characters, a figure recording element, a capital letter shifting device energized through actuation of said figure recording element to effect capitalization of the next succeeding letter to be recorded, and deenergizing means for said capital shifting element controlled through actuation of the next succeeding letter recording element.

11. In a system of control for printing machines, means arranged to record both small and capital letters and punctuation characters, a sentence terminal recording element, a capital shifting device energized through actuation of said sentence terminal recording element to effect capitalization of the next succeeding letter to be recorded, and deenergizing means for said shifting means controlled through actuation of the next succeeding letter recording element.

12. In a system of control for printing machines, means arranged to record both small and capital letters and figure characters, a figure recording element, a spacing mechanism controlled through actuation of said figure recording element, a capital letter shifting device energized through actuation of said figure recording element to effect capitalization of the next succeeding letter to be recorded, and deenergizing means for said capital shifting element controlled through actuation of the next succeeding letter recording element.

13. In a system of control for printing machines, means arranged to record small and capital letters and punctuation characters, a terminal mark recording element, a spacing mechanism energized through actuation of said recording element, and a capital letter shifting device energized through energization of said spacing mechanism.

14. In a system of control for printing machines, a plurality of character recording elements, operating means therefor the character units of which are arranged to be operated in time groups corresponding to words and separated by time intervals, a spacing mechanism controlled normally through said time intervals, and a recording element for punctuation marks also controlling said spacing mechanism.

15. In a system of control for printing machines, a recording mechanism comprising a plurality of individual character units, control means therefor, and an intermediate registering mechanism through which the recording mechanism is actuated from the control means and comprising units individual to the units of the recording mechanism, and sets of connections between certain units of the register also individual each set to a unit of the recording means.

16. In a system of control for printing machines, a recording mechanism, control means therefor, a registering mechanism intermediate the control means and the recording mechanism and comprising a plurality of trunks common to all the actuating elements of the said recording mechanism but normally disconnected therefrom, means actuated over the control circuits to connect said trunks with said actuating means individually, means determining the successive order of said connection, and means independent of the control circuits for successively applying power to said trunks in the same order as connected with said actuating means but at a different rate.

17. In a system of control for printing machines, a recording mechanism, control means therefor, a registering mechanism intermediate the control means and the recording mechanism comprising a plurality of trunks common to all the actuating elements of the recording mechanism but normally disconnected therefrom, means actuated over the control circuits to connect said trunks with said actuating means individually, means determining a successive order of said connection, locking means temporarily locking the connection of a trunk with an actuating element, means independent of the control circuits for successively applying power to said trunks in the same order as connected but at a different rate, and means for releasing the said connections one by one operative upon the actuation of each connected actuating element.

18. In a system of control for printing machines, a recording mechanism, including recording and feeding elements, control means therefor, an intermediate registering device through which the recording mechanism is actuated from the control means, and disabling means for the register operated from record feeding elements of the mechanism, whereby registration is stopped when a feeding operation of the mechanism is initiated.

19. In a system of control for printing machines, a recording mechanism comprising recording and record feeding elements, control means therefor, an intermediate registering mechanism through which the recording elements are normally actuated by the control means, and disabling means for the register operative whenever there is relative movement other than spacing movements between the recording elements and the record.

20. In a system of control for printing machines, a recording mechanism comprising recording and record feeding elements, control means therefor, an intermediate registering mechanism through which the recording elements are normally actuated from the control means, disabling means for the register operative whenever there is relative movement other than spacing between the recording elements and the record, retaining means maintaining the register in disabled condition during the period of such movement, and releasing means actuated at the close of feeding movement to again enable said register.

21. In a system of control for printing machines, a recording mechanism comprising recording and record feeding elements, control means therefor, an intermediate registering mechanism through which the recording elements are normally actuated from the control means, disabling means for the register operative whenever there is relative movement other than spacing movement between the recording elements and the record, and a signal operated when the register is disabled, to apprise the operator thereof.

22. In a system of control for printing machines, an electromagnetic recording mechanism comprising recording and record feeding elements, control means electrically connected thereto, and a cutout switch operative when there is a feeding movement of the mechanism to prevent actuation of the recording elements from the control means.

23. In a system of control for printing machines, a recording mechanism comprising recording and record feeding elements, control means therefor, an intermediate registering mechanism through which the recording elements are actuated from the control means, disabling means for the register operative whenever there is relative movement between the recording elements and the record, a signal operated when the register is disabled, to apprise the operator thereof, and a second signal actuated at the close of the feeding movement.

24. In a system of control for printing machines, a recording mechanism including recording and feeding devices, control means therefor, an intermediate registering mechanism through which the recording devices are normally actuated from the control means, and an interlock between said registering mechanism and the said feeding devices adapted to prevent operation of the one during the period of operation of the other.

25. In a system of control for printing machines, a recording mechanism including recording and feeding devices, an intermediate registering mechanism through which the recording and feeding devices are normally actuated from the control means, and disabling means for the register operative through the initiation of operation of said feeding devices.

26. In a system of control for printing machines, a recording mechanism comprising recording and feeding devices adapted to record spaces and effect traverse of the mechanism respectively, individual control means for actuating said devices, and a control shifting device energized when the margin of the record is reached to shift the space control means from the space recording device to the traversing device.

27. In a system of control for printing machines, a recording mechanism comprising recording and feeding devices, individual control means therefor, and a control shifting device energized when the margin of the record is reached to shift the control means of the recording device to a feeding device.

28. In a system of control for printing machines, a recording mechanism comprising recording and feeding devices, individual control means therefor, a testing relay responsive to the occurrence of a determinate time interval between operations of said control means to control actuation of a syllable recording device, said syllable recording device, and means dependent upon the control of said syllable recording device to effect subsequent and immediately following actuation of a feeding device.

29. In a system of control for printing machines, a recording mechanism including means to record a dash, and a record traversing device, control means for said recording mechanism, a gauge relay responsive to the occurrence of determinate time intervals in the actuation of said control means and controlling the said dash recording device, and means dependent upon the exercise of said control by said gauge relay to control the said traversing device.

30. In a system of control for printing machines, a recording mechanism including a dash recording device, and a traversing device, control means therefor, a gauge relay responsive to the occurrence of determinate time intervals in the actuation of said control means and controlling said dash recording device, an intermediate traverse registering device actuated when said latter control is exercised, and means controlled through the actuation of said dash recording device in conjunction with said registering device to effect actuation of said traversing device.

31. In a system of control for printing machines, comprising a recording mechanism, primary control means therefor, a registering mechanism intermediate the recording mechanism and the primary control means and through which the recording mechanism is normally actuated from the primary control means, said primary control means including control devices for the case shifting movements of the recording mechanism, and case shifting devices associated with said recording mechanism controlled through the aforesaid register mechanism by the aforesaid primary control devices.

32. In a system of control for printing machines, recording mechanism, control means therefor, a registering device intermediate the control means and the recording mechanism, said recording mechanism including actuating elements individual to the characters, and said registering device corresponding registering elements therefor, individual control connections from the control means to the register elements, and series control circuits for individual actuating elements established through the actuation of a plurality of said register elements.

33. In a system of control for printing machines, recording mechanism, control means therefor, a registering device intermediate the control means and the recording mechanism, said recording mechanism including actuating elements individual to the characters to be recorded, and said registering device corresponding registering elements therefor, individual control connections from the control means to the registering elements, individual actuating circuits for certain of said actuating elements controlled from the said control means, and series actuating circuits for others of said actuating elements established through the actuation of a plurality of said register elements.

34. In a system of control for printing machines, recording mechanism, control means therefor, a registering device intermediate the control means and the recording mechanism, said recording mechanism including actuating elements individual to the characters to be recorded, each actuating element comprising two separately energizable electromagnetic parts, said registering device including registering elements corresponding to the actuating elements, individual control circuits from the control means to the elements of the register mechanism, individual actuating circuits from the respective register elements to the said actuating elements of the letter characters, series actuating circuits for the figure actuating elements established by the actuation of a plurality of register elements, a character shift key in said control means, and a switch governing said actuating circuits controlled by said character shift key.

35. In a system of control for printing machines, a recording mechanism including electromagnetic actuating elements individual to the letter characters, and other electromagnetic actuating elements individual to the figure characters, control means common to both of said sets of actuating elements, a figure shift key associated with said control means, and a switch adapted to shift the connection of said control means from one set of said actuating elements to the other itself controlled from said figure shift key.

36. In a system of control for printing machines, a recording mechanism including two sets of character actuating elements, control means therefor, a registering mechanism intermediate the control means and the actuating elements and through which the actuating elements are controlled from the control means, individual control circuits from the elements of the control means to the elements of the registering mechanism, a set of trunks common to the registering elements, individual actuating circuits for one set of said actuating elements closed individually by the register elements over the trunks, a distributing device for the trunks normally actuated from the register elements to determine their successive connection with the said actuating circuits, a distributing switch controlling the energization of said trunk circuits, and itself controlled from said actuating elements, series actuating circuits for the other set of actuating elements established through a series of contacts on a plurality of said registering elements, a figure shift key controlling switching means to shift the control of the register elements from one set of actuating elements to another, and additional switching means operated by said shift key to shift the control of said trunk distributing device from the registering elements to the actuating elements.

37. In a system of control for printing machines, a recording mechanism comprising character actuating elements and elements effecting shifting movements between the character elements and the record, control means for each element having connection therewith, and additional control connection to a shifting element controlled from a connection to a character actuating element.

38. In a system of control for printing machines, a recording mechanism comprising character actuating elements, and a spacing shift element actuated upon the actuation of each character recording element, a case shift element, control means for said elements having connection therewith, and an additional control connection to one of said shifting elements controlled through energization of a connection to a figure character actuating element.

39. In a system of control for printing machines, a recording mechanism comprising a group of character actuating elements, and shifting elements controlling the relative movements of the group and the record, control means for each having connection therewith, and additional control connection for a shifting element controlled through the energization of one of the aforesaid connections to the other shifting elements.

40. In a system of control for printing machines, a recording mechanism including a group of character actuating elements, and shifting elements controlling the relative movements of the group and the record, control means for each having connection therewith, said shifting elements including the usual spacing element controlled automatically by the character elements, and an additional control connection for one of said shifting elements controlled through the energization of the connection to one of its companion elements aforesaid.

41. In a system of control for printing machines, a recording mechanism including a group of character actuating elements and shifting elements controlling the relative movements of the group and the record, control means for each having connection therewith, said shifting elements including the usual spacing element controlled automatically by the character elements, a registering device energized from one of said connections, and an additional control connection for a shifting element controlled jointly by said registration and the actuation of the element from the connection of which said registration was effected.

42. In a system of control for printing machines, a recording mechanism comprising a group of character actuating elements and shifting elements controlling the relative movement of the group and the record, the latter including a "figure" shifting element, control means for each of said elements having connection therewith, additional control connections to said "figure" shift element established through the actuation of a figure character element marking the end of a sentence, and a locking means for said figure shift element connected commonly with letter character actuating elements to be unlocked thereby each time one of them is actuated.

43. In a system of control for printing machines, a recording mechanism comprising a group of character actuating elements and shifting elements controlling the relative movements of the group and the record, the latter including a figure shifting element, control means for each of said elements having operative connection therewith, additional control connections to a space shifting element established through the actuation of a figure character element recording the terminal of a sentence, an additional control connection to said figure shift element established through the aforesaid additional space control connection, and a locking means for said figure shift element connected commonly with the letter character actuating elements to be unlocked thereby when one of them is actuated.

44. In a system of control for printing machines, the combination of a recording mechanism comprising actuating elements for each of the characters, control means therefor, a register mechanism between the control means and the recording mechanism comprising a plurality of registering elements one set for each of said actuating elements, a plurality of trunks common to all of the registering elements, and arranged to be connected by them in succession to the actuating elements, switching means actuated from the actuating elements arranged to energize the said trunks in the same order as that in which they are connected to the actuating elements by the registering elements, and switching means controlled by one registering element arranged to energize another registering element to connect the succeeding trunk to the corresponding actuating element.

45. In a system of control for printing machines, the combination of a recording mechanism comprising actuating elements for each of the characters, control means therefor, a register mechanism between the control means and the recording mechanism comprising a plurality of registering elements one set for each of said actuating elements, a plurality of trunks common to all of the registering elements, and arranged to be connected by them in succession to the actuating elements, switching means actuated from the actuating elements arranged to energize the said trunks in the same order as that in which they are connected to the actuating elements by the registering elements, a relay having a control circuit closed jointly by the energization of one registering element and the shifting of the trunks to the next succeeding that connected by said registering element, and a control circuit for another registering element closed jointly by said relay and means operated by said trunk shifting means.

46. In a system of control for printing machines, the combination of a recording mechanism, control means therefor, an intermediate register for recorded characters, switching means controlling the operation of the register, and additional switching means arranged to control the translation of the registrations into actuation of the recording mechanism.

47. In a system of control for printing machines, the combination of a recording mechanism, control means therefor, of a register arranged to effect registration of the characters as they are recorded, switching means governed from the record sheet controlling the operation of the register, and additional switching means also controlled from the record sheet arranged to control the translation of the registrations into record on the said sheet.

48. In a system of control for printing machines, the combination of a recording mechanism, control means therefor, an auxiliary register arranged to effect registration of the characters as they are recorded, switching means controlling the energization of said register, means connected with the recording mechanism and operable on the first recorded line only of the first page only to actuate said switch to enable said register, additional switching means arranged between the register and the recording mechanism to translate the registrations of said register into actuation of said recording mechanism, and means connected with said recording mechanism and operable on the first line only of pages succeeding the first only to actuate said additional switching means.

49. In a system of control for printing machines, the combination of a recording mechanism, control means therefor, an auxiliary register arranged to effect registration of the characters as they are recorded, a page counter actuated from the recording mechanism, connections between said page counter and said register arranged to effect registration of the number of the page counted, switching means between the register and the recording mechanism arranged to translate said registrations into record, and means for controlling said switching means.

50. In a system of control for printing machines, the combination of a recording mechanism, of control means therefor, an auxiliary register, a page counter, connections between said page counter and the register arranged to effect registration of the numbers of counted pages, means connected with the recording mechanism and controlled by the record sheet to actuate said page counter, and means controlled from a determinate line of each record sheet arranged to translate the preceding registration of said page counter into record.

51. In a system of control for printing machines, the combination of a recording mechanism of control means therefor adapted to make a continuous printed record, a page counter registering upon itself the numbers of pages, connections between said page counter and the recording mechanism arranged to translate the registration of said numbers into record, and control means for said connections.

52. In a system of control for printing machines, the combination of a recording mechanism of control means therefor, a page counter registering upon itself the numbers of pages, connections between said page counter and the recording mechanism arranged to translate the registration of said numbers into record, and control means for said connections governed from the record feed.

53. In a system of control for printing machines, the combination of a recording mechanism, of control means therefor, an auxiliary register arranged to effect registrations of the recorded characters, switching means controlling the energization of the register, actuating means for said switch operable from a determinate line of said record through the record of capital characters, and additional switching means intermediate the register and the recording mechanism arranged to translate the registrations into record.

54. In a system of control for printing machines, the combination of a recording mechanism of a control means therefor, a normally disabled auxiliary register arranged to effect registration of recorded characters, switching means controlling the enablement of said register, additional switching means between the register and the recording mechanism controlling the translation of the registrations into record, and restoring means for said register.

55. In a system of control for printing machines, the combination of a recording mechanism of a control means therefor, a normally disabled auxiliary register arranged to effect registration of recorded characters, switching means controlling the enablement of said register, additional switching means between the register and the recording mechanism controlling the translation of the registrations into record, restoring means for said register, a subscripture device associated with said recording mechanism and control means, and operating connections between said subscripture device and said restoring means.

56. In a system of control for printing machines, the combination of a recording mechanism, control means therefor, an intermediate normally active registering mechanism through which the recording mechanism is operated from the control means, said registering mechanism comprising registering elements individual to the characters to be recorded, an auxiliary registering mechanism also comprising individual elements and arranged with its elements in parallel with the elements of said primary register but normally disabled, and switching means for at will enabling said auxiliary register.

57. In a system of control for printing machines, recording mechanism, control means therefor, an auxiliary register arranged to effect registration of recorded characters, but normally disabled, a character shifting device, switching means controlled by said device to enable said register during the period of shift of said device, an actuating element for a punctuation mark, and switching means controlled in the actuation of said element to remove said register temporarily from the control of said character shifting device.

58. In a system of control for printing machines, a recording mechanism, control means therefor, an auxiliary register normally disabled but arranged to effect registrations of recorded characters, means controlled from the first line of the first record sheet to enable said register, switching means between said register and the recording mechanism controlled from determinate lines succeeding sheets to translate the registrations of said register into record characters, and additional switching means also controlled from the determinate lines of succeeding sheets to temporarily remove said recording mechanism from control of said control means.

59. In a system of control for printing machines, a recording mechanism, control means therefor, an auxiliary register arranged to effect registrations of recorded characters, connections through which said registrations may be translated into recorded characters, a dating mechanism arranged to be set to indicate the date, connections between said dating device and said recording mechanism through which said indications may be translated into a recorded date, and control connections between said auxiliary register and the dating device whereover the operation of translation of the one effects initiation of a similar operation of the other.

60. In a system of control for printing machines, a recording mechanism, control means therefor, an auxiliary character register, a dating device arranged to be set to indicate the date, a page counter operated from the recording mechanism to register the page, circuits of translation between each of said devices and said recording mechanism, through which said registrations, indications and counts may be translated into recorded characters, and interlocking circuits between said several devices establishing a determinate sequence of operation thereof.

61. In a system of control for printing machines, a recording mechanism, control means therefor, an auxiliary character register, a dating device arranged to be set to indicate the date, a page counter operated from the recording mechanism to register the page, circuits of translation between each of said devices and said recording mechanism, through which said registrations, indications and counts may be translated into recorded characters, switching means controlled from a determinate line of a determinate page initiating the operation of translation from one of said devices, and interlocking circuits between said one and the others establishing a determinate sequence of operation thereof.

62. In a system of control for printing machines, a recording mechanism, control means therefor, an auxiliary character register, arranged to effect registration of recorded characters, a page counter, connections between the register and the page counter and the recording mechanism to translate the registrations and counter indications into recorded characters, and interlocking circuits between said register and counter establishing a determinate sequence of operation.

63. In a system of control for printing machines, a recording mechanism, control means therefor, an auxiliary register arranged to effect intermittently during the recording registration of recorded characters, connections between said register and said recording mechanism through which said registrations may be translated into recorded characters, and control means for said connections.

64. In a system of control for printing machines, a recording mechanism adapted to make a continuous printed record, control means therefor, a page counter arranged to count the number of pages of record, connections between said counter and said mechanism arranged to translate the count of said mechanism into recorded characters, and control means for said connections.

65. In a system of control for printing machines, a character recording mechanism, control means therefor, a dating device arranged to be set with reference to said mechanism to indicate the date, connections between said device and said mechanism arranged to actuate said mechanism to translate the indications of said device into recorded characters, and means to control said connections.

66. In a system of control for printing machines, a recording mechanism, control means therefor, an initialing device arranged to be set to indicate the initials of a dictator, connections between said initialing device and said recording mechanism arranged to translate said indications into recorded characters and automatic control means for said connections.

67. In a system of control for printing machines, recording mechanism, control means therefor, an auxiliary character designating device arranged to be set to designate the record of chosen characters as the initials of a dictator, connections between said device and the recording mechanism arranged to effect translation of the designations into recorded characters, control means for said connections actuated from determinate lines of determinate pages of the record, a record traversing element for said mechanism, and control connection to said traversing element established through the aforesaid operation of translation.

68. In a system of control for printing machines, the combination of a recording mechanism, control means therefor, a page counter arranged to count the pages as they are recorded, a register device associated with said page counter and comprising a locking relay for each numeral of the counter, controlling connections to the corresponding numeral actuators of the recording mechanism, a common control trunk for all of said connections and to which they are connected singly by said relays, means to complete the circuits of said connections over said trunk, and common means for simultaneously releasing all of said relays.

69. In a system of control for printing machines, a recording mechanism, control means therefor, a page counter arranged to count the pages as they are recorded, connections between said counter and said recording mechanism arranged to translate the count into recorded characters, and automatic means for restoring the page counter to a zero position when the writing is completed.

70. In a system of control for printing machines, a recording mechanism, control means therefor, a character designating device arranged to be set to designate the record of chosen characters, connections between said device and said mechanism arranged to effect translation of the designations into recorded characters, control means for said connections, and automatic restoring means for said designating device.

71. In a system of control for printing machines, recording mechanism, control means therefor, an auxiliary register arranged to make registration of recorded characters, a page counter arranged to count pages as they are recorded, a register for said count, translating connections between each of said registers and the recording mechanism over which the registrations and counts are translated into record, control means for said connections, restoring means for the page counter register operable after each translation, and restoring means for the first named register operable only when the record is completed.

72. In a system of control for printing machines, a recording mechanism having a subscripture position, releasing means permitting relative movement of the record and recording mechanism to record at said position, a line traversing device, a subscripture key controlling said subscripture releasing means and said line traversing device jointly.

73. In a system of control for printing machines, a recording mechanism having a subscripture position, releasing means permitting relative movement of the record and recording mechanism to record at said position, a subscripture key, and a line traversing device energized by operation of said key and in turn controlling said subscripture releasing means.

74. In a system of control for printing machines, a recording mechanism including a punctuation character element, and a line traversing device and an initialing device controlled jointly thereby.

75. In a system of control for printing machines, a recording mechanism including a punctuation character element, and a line traversing device and an initialing device controlled in succession thereby.

76. In a system of control for printing machines, a recording mechanism including a punctuation character element, together with an initialing device controlled thereby.

77. In a system of control for printing machines, a recording mechanism having a paragraph position, releasing means permitting relative movement of the record and recording mechanism to record at said position, a line traversing device, and a paragraph key controlling said paragraph releasing means and said line traversing device jointly.

78. In a system of control for printing machines, a recording mechanism having a paragraph position, releasing means permitting relative movement of the record and recording mechanism to record at said position, a paragraph key, and a line traversing device energized by operation of said key and in turn controlling said paragraph releasing means.

79. In a system of control for printing machines, a recording mechanism, actuating means therefor, control means for the actuating means, individual control connections from each of a number of said control means to the actuating means, and group control connections from certain groups of said number of control means individual those of each group to a single actuating unit.

80. In a system of control for printing machines, in combination an initialing device arranged to make a record of the initials of the dictator on a record sheet, and a sheet feeding mechanism controlled from said initialing mechanism.

81. In a system of control for printing machines, in combination an initialing device arranged to make a record of the initials of the dictator on a record sheet, and a sheet feeding mechanism controlled from said initialing mechanism, together with a line traversing mechanism also controlled from said initialing mechanism.

In testimony whereof I affix my signature.

JOHN P. TARBOX.